US011298708B2

(12) United States Patent
Varanasi et al.

(10) Patent No.: US 11,298,708 B2
(45) Date of Patent: Apr. 12, 2022

(54) MESHES CAPABLE OF DROPLET FRAGMENTATION, AND RELATED SYSTEMS AND USES THEREOF

(71) Applicant: Massachusetts Institute of Technology, Cambridge, MA (US)

(72) Inventors: Kripa K. Varanasi, Lexington, MA (US); David Quere, Paris (FR); Dan Soto, Boston, MA (US); Thomas Jean-Yves Binder, Paris (FR); Antoine Le Helloco, Paris (FR); Henri-Louis Girard, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 211 days.

(21) Appl. No.: 16/552,296

(22) Filed: Aug. 27, 2019

(65) Prior Publication Data
US 2020/0078803 A1 Mar. 12, 2020

Related U.S. Application Data

(60) Provisional application No. 62/725,134, filed on Aug. 30, 2018.

(51) Int. Cl.
*B05B 1/26* (2006.01)
*B05B 7/00* (2006.01)

(52) U.S. Cl.
CPC .............. *B05B 1/26* (2013.01); *B05B 7/0037* (2013.01)

(58) Field of Classification Search
CPC .................................. B05B 7/0037; B05B 1/26
USPC ......... 239/552, 553, 553.3, 596, 601, 590.3, 239/590, 343, 504, 376, 377, 378, 239/DIG. 23
See application file for complete search history.

(56) References Cited

U.S. PATENT DOCUMENTS 2,915,252 A * 12/1959 Umbricht ................ B05B 1/262
239/552
4,629,123 A   12/1986 Gorder
5,064,103 A * 11/1991 Bennett ................ B05B 7/0037
239/343

OTHER PUBLICATIONS

Bird et al., Daughter bubble cascades produced by folding of ruptured thin films. Nature. Jun. 10, 2010;465(7299):759-62.
Bird et al., Reducing the contact time of a bouncing drop. Nature. Nov. 21, 2013;503(7476):385-8. Supplemental information included. 14 pages total.
Brunet et al., To grate a liquid into tiny droplets by its impact on a hydrophobic microgrid. Applied Physics Letters. 2009;95:254102. Epub Dec. 21, 2009.
Clanet et al., Transition from dripping to jetting. Journal of Fluid Mechanics. Mar. 1999;383:307-26. Epub Mar. 25, 1999.
Culick et al., Comments on a Ruptured Soap Film. J Appl Phys. Jun. 1960;31:1128-9.
Dressaire et al., Drop impact on a flexible fiber. Soft Matter. 2016;12:200-8. Epub Oct. 6, 2015.
Eggers et al., Physics of liquid jets. Reports on Progress in Physics. 2008;71:036601. Epub Feb. 21, 2008. 79 pages.
Gauthier et al., Water impacting on superhydrophobic macro textures. Nature Communications. 2015;6:8001. Epub Aug. 11, 2015. 6 pages.

(Continued)

*Primary Examiner* — Steven J Ganey
(74) *Attorney, Agent, or Firm* — Wolf, Greenfield & Sacks, P.C.

(57) ABSTRACT

Meshes capable of droplet fragmentation are generally described. Inventive articles, systems, and uses thereof are also described.

18 Claims, 22 Drawing Sheets

(56) References Cited

OTHER PUBLICATIONS

Gilet et al., Fluid fragmentation shapes rain-induced foliar disease transmission. J. R. Soc. Interface. 2015;12:20141092. Epub Mar. 6, 2015. 12 pages.
Gilet et al., Rain-induced ejection of pathogens from leaves: revisiting the hypothesis of splash-on-film using high-speed visualization. Integr Comp Biol. Dec. 2014;54(6):974-84. Epub Oct. 17, 2014.
Hilz et al., Spray drift review: The extent to which a formulation can contribute to spray drift reduction. Crop Prot. Feb. 2013;44:75-83. Epub Nov. 24, 2012.
Hsu et al., Impaction of a droplet on an orifice plate. Physics of Fluids. 2004;16:400. Epub Jan. 7, 2004.
Josserand et al., Drop Impact on a Solid Surface. Annu. Rev. Fluid Mech. 2016;48:365-91. Epub Sep. 21, 2015.
Kim et al., Drop impact on a fiber. Physics of Fluids. 2016;28:042001. 9 pages. Epub Apr. 12, 2016.
Kumar et al., Effect of geometrical parameters on rebound of impacting droplets on leaky superhydrophobic meshes. Soft Matter. 2018;14:1571-80. Epub Jan. 9, 2018.
Kumar et al., Internal flow measurements of drop impacting a solid surface. Experiments in Fluids. 2017;58:12. 9 pages. Epub Feb. 3, 2017.
Lagubeau et al., Spreading dynamics of drop impacts. Journal of Fluid Mechanics. Dec. 2012;713:50-60. Epub Oct. 1, 2012.
Lefebvre et al., Atomization and Sprays. Taylor & Francis. CRC Press. Boca Raton, FL. Second Edition. 2017:301 pages.
Lembach et al., Drop Impact, Spreading, Splashing, and Penetration into Electrospun Nanofiber Mats. Langmuir. 2010;26(12):9516-23. Epub Mar. 5, 2010.
Lhuissier et al., Bursting bubble aerosols. Journal of Fluid Mechanics. Apr. 2012;696:5-44. Epub Nov. 18, 2011.
Lhuissier et al., Drop Fragmentation at Impact onto a Bath of an Immiscible Liquid. Physical Review Letters. Jun. 2013;110(26):264503. 5 pages.
Lorenceau et al., Drops impacting a sieve. J Colloid Interface Sci. Jul. 1, 2003;263(1):244-9.
Magarvey et al., Shattering of Large Drops. Nature. Apr. 1956;177:745-6.
Rimbert et al., Crossover between Rayleigh-Taylor instability and turbulent cascading atomization mechanism in the bag-breakup regime. Phys Rev E. Jul. 2011;84(1 Pt 2):016318. 10 pages. Epub Jul. 29, 2011.
Ryu et al., Water Penetration through a Superhydrophobic Mesh During a Drop Impact. Phys Rev Lett. Jan. 2017;118(1):014501. Epub Jan. 3, 2017.
Sahu et al., Impact of aqueous suspension drops onto non-wettable porous membranes: Hydrodynamic focusing and penetration of nanoparticles. Colloids and Surfaces A: Physicochemical and Engineering Aspects. Feb. 2015;467:31-45. Epub Nov. 20, 2014.
Soto et al., Droplet fragmentation using a mesh. Physical Review Fluids. 2018;3:083602. Epub Aug. 28, 2018. 10 pages.
Van Hoeve et al., Breakup of diminutive Rayleigh jets. Physics of Fluids. 2010;22:122003. Epub Dec. 8, 2010. 11 pages.
Villermaux et al., Single-drop fragmentation determines size distribution of raindrops. Nat Phys. 2009;5(9):697-702. Epub Jul. 20, 2009.
Wang et al., The role of jet and film drops in controlling the mixing state of submicron sea spray aerosol particles. PNAS. 2017;114(27):6978-83. Epub Jun. 19, 2017.
Xu et al., Water drop impacts on a single-layer of mesh screen membrane: Effect of water hammer pressure and advancing contact angles. Experimental Thermal and Fluid Science. Apr. 2017;82:83-93. Epub Nov. 8, 2016.

\* cited by examiner

MESHES CAPABLE OF DROPLET FRAGMENTATION, AND RELATED SYSTEMS AND USES THEREOF

RELATED APPLICATIONS

This application claims priority under 35 U.S.C. § 119(e) to U.S. Provisional Patent Application No. 62/725,134, filed Aug. 30, 3018, and entitled "Droplet Fragmentation Using a Mesh for Atomization Processes," which is incorporated herein by reference in its entirety for all purposes.

TECHNICAL FIELD

Meshes capable of droplet fragmentation, and related systems and uses thereof, are generally described.

SUMMARY

Meshes capable of droplet fragmentation are generally described. Inventive articles and systems comprising such meshes, and uses thereof are also described. In some embodiments, the mesh comprises a plurality of openings. In certain embodiments, the mesh is capable of inducing breakup of at least a portion of a plurality of impinging millimetric droplets into a plurality of sub-millimetric droplets. In some cases, the mesh has this capability even when the impinging millimetric droplets are transported to the mesh solely under a gravitational force of the earth. In some embodiments, an article comprises the mesh and a supporting apparatus, that supports the mesh and positions the mesh at a specified distance and/or angle from, for example, plants and/or a line perpendicular to the direction of gravity. In some embodiments, a system comprises the mesh and a source of millimetric droplets. In some embodiments, the system comprises an unmanned aerial vehicle and the mesh. In certain embodiments, the meshes, articles, systems, and/or methods described herein are useful in agricultural processes (e.g., watering and/or spraying pesticides), temperature-reducing processes (e.g., cooling towers), paint spraying, and/or humidification processes. The subject matter of the present invention involves, in some cases, interrelated products, alternative solutions to a particular problem, and/or a plurality of different uses of one or more systems and/or articles.

In one aspect, a mesh is provided. In some embodiments, the mesh comprises a plurality of openings, the mesh capable of inducing breakup of at least a portion of a plurality of impinging millimetric droplets into a plurality of sub-millimetric droplets when the impinging millimetric droplets are transported to the mesh solely under a gravitational force of the earth.

In certain embodiments, the mesh comprises a plurality of openings extending through the thickness of the mesh, wherein at least 10% of the facial area of the mesh is occupied by openings, and wherein the openings have an average cross-sectional diameter of between 1 µm and 10 mm.

In one aspect, an article is provided. In some embodiments, the article is constructed to position a mesh above a plant and comprises a mesh and supporting apparatus that supports the mesh and positions the mesh at a distance from the plant, the mesh comprising a plurality of openings of size selected to induce breakup of at least a portion of a plurality of impinging millimetric droplets into a plurality of sub-millimetric droplets when the impinging millimetric droplets are transported to the mesh solely under a gravitational force of the earth, and the distance being selected to allow the sub-millimetric droplets to reach the plant with a minimum of drift.

In one aspect, a system is provided. In certain embodiments, the system comprises a source of millimetric droplets; and a mesh comprising a plurality of openings, the mesh spatially separated from the source of the millimetric droplets; wherein the source and the mesh are configured such that, when the millimetric droplets move from the source through the openings of the mesh, at least a portion of the millimetric droplets are fragmented into a plurality of sub-millimetric droplets.

In some embodiments, the system comprises an unmanned aerial vehicle comprising a reservoir configured to contain a liquid; and a nozzle in fluid communication with the reservoir, the nozzle configured to generate a spray comprising a plurality of droplets from the liquid; and a mesh comprising a plurality of openings, the mesh configured such that, when the plurality of droplets move from the nozzle through the openings of the mesh, at least a portion of the plurality of droplets are fragmented into a plurality of smaller droplets.

In one aspect, a method is provided. In certain embodiments, the method comprises generating millimetric droplets; and transporting at least a portion of the millimetric droplets through a mesh comprising a plurality of openings; wherein the transporting at least a portion of the millimetric droplets through the mesh breaks up at least a portion of the millimetric droplets into sub-millimetric droplets.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Meshes capable of droplet fragmentation, related systems comprising the same, and uses thereof, are generally described. Certain embodiments are related to inventive meshes that comprise a plurality of openings. In certain embodiments, the mesh is capable of inducing breakup of at least a portion of a plurality of impinging millimetric droplets into a plurality of sub-millimetric droplets. In some cases, the mesh has this capability even when the impinging millimetric droplets are transported to the mesh solely under the gravitational force of the earth.

In some embodiments, an article comprises the mesh and a supporting apparatus that supports the mesh and positions the mesh at a specified distance and/or angle from, for example, a plant and/or a line perpendicular to the direction of gravity. In certain cases, the articles disclosed herein are useful in watering and/or spraying pesticides on the plants and/or a line perpendicular to the direction of gravity.

In accordance with certain embodiments, a system comprises the mesh and a source of millimetric droplets. In some embodiments, the system comprises an unmanned aerial vehicle and the mesh, wherein the unmanned aerial vehicle comprises a reservoir and a nozzle. In certain embodiments, the article and/or system comprises a vessel, which, in accordance with some embodiments, is configured to collect the droplets that do not move from the source through the openings of the mesh, and instead roll down the mesh.

In certain embodiments, the meshes, articles, systems, and/or methods described herein are useful in agricultural processes (e.g., watering and/or spraying pesticides), temperature-reducing processes (e.g., cooling towers), paint spraying, and/or humidification processes (e.g., as a surface that induces liquid/vapor contact within a humidifier). In some embodiments, the meshes, articles, systems, and/or methods described herein create fine sprays closer to the desired target (e.g., a plant) than conventional fluid spraying systems (e.g., airplanes used for crop dusting). In some embodiments, this closer distance results in a reduced amount of drift than in conventional fluid spraying systems.

Atomization and spray generation naturally occur in a wide variety of situations ranging from drop impacts to bubble bursting. However, controlling this process is key in many applications such as internal combustion engines, gas turbines, or agricultural spraying.

Figure 1A:
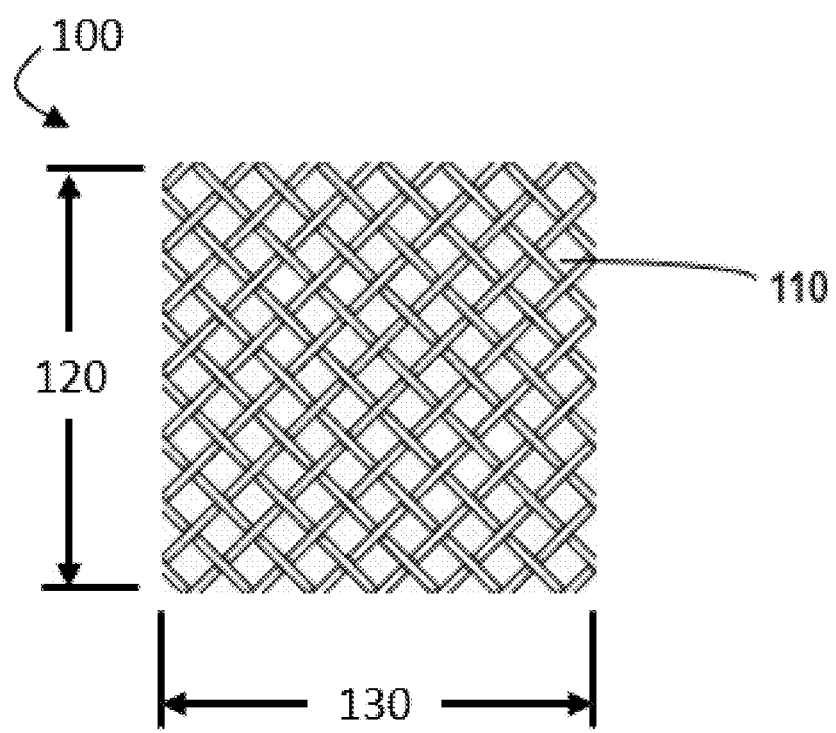
FIG. 1A is, in accordance with certain embodiments, a top view of a mesh.

As noted above, certain aspects are related to meshes. In some embodiments, the mesh comprises a plurality of openings. For example, in FIG. 1A, mesh 100 comprises a plurality of openings 110. The plurality of openings within the mesh can be formed by or within a solid material. For example, a plurality of solid threads can be woven, resulting in openings formed between the woven threads. Alternatively, openings can be formed by poking holes through an initially-solid sheet. Those of ordinary skill in the art, given the insight provided by the present disclosure, would be capable of selecting additional suitable methods for forming meshes suitable for use in the systems and methods disclosed herein.

Figure 1B:
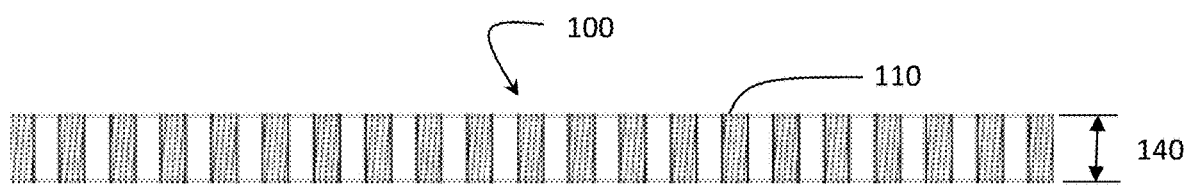
FIG. 1B is, in accordance with certain embodiments, a cross-sectional schematic illustration of a mesh.

In certain embodiments, the openings extend through the thickness of the mesh. For example, in FIG. 1B, openings 110 extend through thickness 140 of mesh 100. In some embodiments, the thickness of the mesh is up to 1 mm, up to 2 mm, up to 5 mm, or up to 10 mm. In some embodiments, the thickness of the mesh is at least 0.1 microns. At least 1 micron, at least 10 microns, or at least 100 microns. Combinations of these ranges are also possible (e.g., 10 microns-5 mm). In some embodiments, the ratio of the thickness of the mesh to the average diameter of the openings is up to 1, up to 1.5, up to 2, or up to 3.

In some embodiments, at least 10%, at least 20%, at least 30%, at least 40%, at least 50%, at least 60%, at least 70%, or at least 80% of the facial area of the mesh is occupied by openings. In certain embodiments, less than or equal to 90%, less than or equal to 80%, less than or equal to 70%, less than or equal to 60%, or less than or equal to 50% of the facial area of the mesh is occupied by openings. Combinations of these ranges are also possible (e.g., 30-60%). The percentage of the facial area of the mesh occupied by openings (FAo) is determined as follows:

$$FA_O = \frac{GA_O}{GA_M} \times 100\%$$

Wherein $GA_O$ is the sum of the geometric areas of all of the openings within the mesh and $GA_M$ is the geometric area of the mesh when spread into a flat plane. For example, in FIG. 1A, the $GA_M$ of mesh 100 is calculated by multiplying first dimension 120 by second dimension 130. The "geometric area" of an article refers to mathematical area of the geometric surface of that article, and the "geometric surface" of an article refers to the surface defining the outer boundaries of the article (for example, the area that may be measured by a macroscopic measuring tool, such as a ruler). The geometric area does not include the internal surface area (e.g., area within pores of a porous material such as a foam, or surface area of those fibers of a mesh that are contained within the mesh and do not define the outer boundary, etc.).

In certain embodiments, the openings of the mesh have an average cross-sectional diameter of at least 1 micron, at least 10 microns, at least 25 microns, at least 50 microns, at least 75 microns, at least 100 microns, at least 125 microns, at least 150 microns, at least 250 microns, at least 500 microns, at least 1 mm, or at least 5 mm. In some embodiments, the openings have an average cross-sectional diameter of less than or equal to 10 mm, less than or equal to 5 mm, less than or equal to 1 mm, less than or equal to 500 microns, less than or equal to 250 microns, less than or equal to 150 microns, less than or equal to 125 microns, less than or equal to 100 microns, or less than or equal to 75 microns. Combinations of these ranges are also possible (e.g., between 1 micron and 10 mm or between 50 microns and 150 µm).

Figure 2:
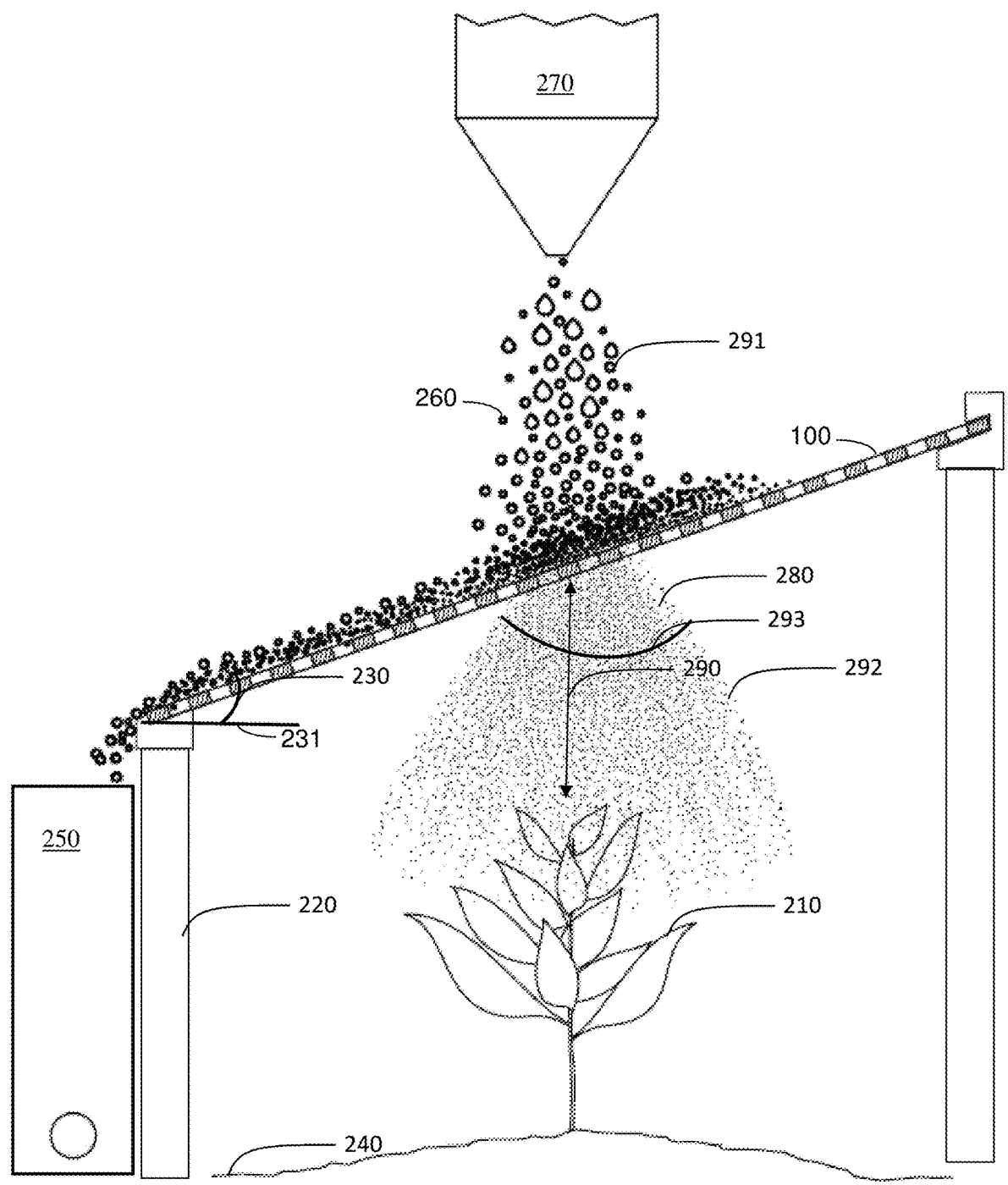
FIG. 2 is, in accordance with certain embodiments, a system comprising a mesh.

In certain embodiments, the mesh is capable of inducing breakup of at least a portion of a plurality of impinging droplets (e.g., millimetric droplets) into a plurality of smaller droplets (e.g., sub-millimetric droplets) when the impinging droplets (e.g., millimetric droplets) are transported to the mesh. For example, in FIG. 2, mesh 100 is inducing breakup of droplets 260 (e.g., millimetric droplets) into a plurality of smaller droplets 280 (e.g., sub-millimetric droplets) as droplets 260 (e.g., millimetric droplets) are transported to mesh 100. In some cases, the mesh is capable of inducing breakup of at least a portion of a plurality of impinging droplets (e.g., millimetric droplets) into a plurality of smaller droplets (e.g., sub-millimetric droplets) when the impinging droplets (e.g., millimetric droplets) are transported to the mesh solely under a gravitational force of the earth. In some embodiments, the openings are of a size selected to induce breakup of at least a portion of a plurality of impinging droplets (e.g., millimetric droplets) into a plurality of smaller droplets (e.g., sub-millimetric droplets) when the impinging droplets (e.g., millimetric droplets) are transported to the mesh solely under a gravitational force of the earth.

A mesh is capable of inducing breakup of at least a portion of a plurality of impinging millimetric droplets into a plurality of sub-millimetric droplets when the impinging millimetric droplets are transported to the mesh solely under a gravitational force of the earth if, for at least one size of millimetric droplets, the millimetric droplets are broken up into a plurality of sub-millimetric droplets when the millimetric droplets are transported to the mesh using only the gravitational force of the earth to induce the motion of the millimetric droplets. As would be understood by a person of ordinary skill in the art, impinging millimetric droplets need not actually be transported to the mesh solely under a gravitational force of the earth for the mesh itself to be "capable of" inducing such breakup.

As used herein, "millimetric" means 1 mm or more (e.g., 2 mm or more, 5 mm or more, or 7 mm or more) but less than 1 cm (e.g., less than 9 mm, less than 7 mm, or less than 5 mm). For example, millimetric droplets are fluid droplets wherein the diameter of a sphere having the same volume as the fluid droplet would be 1 mm or more (e.g., 2 mm or more, 5 mm or more, or 10 mm or more) but less than 1 cm (e.g., less than 9 mm, less than 7 mm, or less than 5 mm).

As used herein, "sub-millimetric" means 100 microns or less (e.g., 80 microns or less, 60 microns or less, 40 microns or less, or 20 microns or less). For example, sub-millimetric droplets are fluid droplets wherein the diameter of a sphere having the same volume as the fluid droplet would be 100 microns or less (e.g., 80 microns or less, 60 microns or less, 40 microns or less, or 20 microns or less).

In some embodiments, fluid droplets are liquid-containing droplets. Examples of liquid-containing droplets include droplets of a pure liquid, a mixture of two or more liquids, a suspension, a solution, and the like.

In certain embodiments, breakup of at least a portion of a plurality of impinging droplets (e.g., millimetric droplets) into a plurality of smaller droplets (e.g., sub-millimetric droplets) comprises forming at least 2, at least 5, at least 10, at least 20, at least 50, at least 100, or at least 1,000 smaller droplets from an impinging droplet. In some cases, breakup of at least a portion of a plurality of impinging droplets (e.g., millimetric droplets) into a plurality of smaller droplets (e.g., sub-millimetric droplets) comprises forming up to 20, up to 50, up to 100, up to 1,000, up to 10,000, or more droplets from one droplet. Combinations of these ranges are also possible (e.g., 2-50). In some embodiments, the average diameter of the smaller droplets is less than or equal to ½, less than or equal to ⅕, less than or equal to 1/10, less than or equal to 1/20, less than or equal to 1/100, or less than or equal to 1/1,000 of the average diameter of the impinging droplets. In certain cases, the average size of the smaller droplets is at least ⅕, at least 1/20, at least 1/50, at least 1/100, at least 1/1,000, or at least 1/5,000 the average size of the impinging droplets. Combinations of these ranges are also possible (e.g., 1/20-⅕).

In some embodiments, the ratio of the average diameter of the impinging droplets (e.g., millimetric droplets) to the average diameter of the mesh openings is at least 2:1, at least 5:1, at least 10:1, at least 20:1, at least 50:1, at least 100:1, or at least 1,000:1. In certain embodiments, the ratio of the average diameter of the impinging droplets (e.g., millimetric droplets) to the average diameter of the mesh openings is less than or equal to less than or equal to 5,000:1, less than or equal to 1,000:1, less than or equal to 500:1, less than or equal to 100:1, less than or equal to 50:1, or less than or equal to 20:1. Combination of these ranges are also possible (e.g., between 5:1 and 50:1, inclusive). In addition to meshes, articles comprising meshes (e.g., any of the meshes described elsewhere herein) are also described.

In certain embodiments, the article is constructed such that the mesh is positioned above a plant. For example, in FIG. 2, mesh 100 is position above plant 210. In some embodiments, the plant comprises a crop. Non-limiting examples of crops include corn, soy, rice, wheat. In some embodiments, the plant comprises a fruit. In certain embodiments, the plant comprises a berry. In certain embodiments, the article comprises a supporting apparatus. For example, in FIG. 2, the article comprises supporting apparatus 220. In some cases, the supporting apparatus supports the mesh. For example, in FIG. 2, supporting apparatus 220 supports mesh 100.

In certain instances, the supporting apparatus positions the mesh at a distance from the desired target (e.g., a plant). For example, in FIG. 2, supporting apparatus 220 positions mesh 100 at distance 290 from plant 210. The distance is measured at the closest portions of the mesh to the plant. In some embodiments, the mesh is positioned at a distance such that a fine spray (e.g., from breakup of at least a portion of a plurality of impinging droplets (e.g., millimetric droplets) into a plurality of smaller droplets (e.g., sub-millimetric droplets) when the impinging droplets (e.g., millimetric droplets) are transported to the mesh) can be created closer to the desired target (e.g., a plant) than conventional fluid spraying systems (e.g., airplanes).

In some embodiments, the distance between the mesh and the desired target (e.g., a plant) is at least 1 cm, at least 10 cm, or at least 1 meter. In certain embodiments, the distance between the mesh and the desired target (e.g., a plant) is up to 1 meter, up to 2 meters, or up to 5 meters. Combinations of these ranges are also possible (e.g., 10 cm-1 meter).

In some embodiments, the distance is selected to allow the smaller droplets (e.g., sub-millimetric droplets) created by the mesh to reach the plants with a minimum of drift. Examples of drift include horizontal movement of the droplets (e.g., from wind) causing them to deviate from a ballistic trajectory. For example, in some embodiments, impinging droplets (e.g., millimetric droplets) are transported to the mesh in a narrow stream. For example, in FIG. 2, droplets 260 (e.g., millimetric droplets) are transported to mesh 100 in narrow stream 291. In certain embodiments, the mesh breaks up at least a portion of a plurality of the impinging droplets (e.g., millimetric droplets) into a plurality of smaller droplets (e.g., sub-millimetric droplets). For example, in FIG. 2, mesh 100 breaks up at least a portion of a plurality of droplets 260 (e.g., millimetric droplets) into a plurality of smaller droplets 280 (e.g., sub-millimetric droplets). In some cases, these smaller droplets are more susceptible to drift (e.g., from wind) than the impinging droplets, due to their smaller size. However, the distance between the mesh and the intended target can be selected to minimize the amount of drift. In certain embodiments, the distance is selected such that the drift is minimized or reduced compared to systems that are substantially the same (e.g., identical) except without the mesh. For example, in some embodiments, if pesticides were sprayed on a crop at a distance of 10 meters, the drift would be minimized or reduced when a mesh (e.g., at a distance of 1 meter) disclosed herein was used than when a mesh disclosed herein was not used. In some cases, the drift is reduced by at least 1.5 times, at least 3 times, at least 5 times, at least 10 times, or at least 100 times the drift of an analogous system sprayed from a distance 3 times higher. In certain instances, when the narrow stream of impinging droplets is transported to the mesh, the mesh breaks up at least a portion of a plurality of the impinging droplets (e.g., millimetric droplets) into a plurality of smaller droplets (e.g., sub-millimetric droplets), and a coning effect is unexpectedly observed. In some cases, a cone-shaped spray of smaller droplets (e.g., sub-millimetric droplets) is formed on the other side of the mesh, rather than the narrow stream on the first side of the mesh. For example, in FIG. 2, when narrow stream 291 of droplets 260 (e.g., millimetric droplets) is transported to mesh 100, mesh 100 breaks up at least a portion of a plurality of droplets 260 (e.g., millimetric droplets) into a plurality of smaller droplets 280 (e.g., sub-millimetric droplets), and cone-shaped spray 292 of smaller droplets 280 (e.g., sub-millimetric droplets) is formed. In some embodiments, this unexpected coning effect allows the transfer of liquid outside the projected impact area of the drop and the existence of a well-defined cone envelope for the resulting spray.

In certain embodiments, the smaller droplets (e.g., sub-millimetric droplets) are spread over a larger impact area than the impact area of the original spray. In some cases, the smaller droplets (e.g., sub-millimetric droplets) are spread over an impact area at least 2 times, at least 5 times, or at least 10 times the impact area of the original spray. In certain instances, the smaller droplets (e.g., sub-millimetric droplets) are spread over an impact area less than or equal to 100 times, less than or equal to 50 times, less than or equal to 10 times, or less than or equal to 5 times the impact area of the original spray. Combinations of these ranges are also possible (e.g., 2-10 times).

In certain embodiments, the meshes are woven with circular wires (h=d), and hole aspect ratio can be expressed as $h/2b=1/\sqrt{\phi}-1$, such that:

$$\alpha^* \sim \arctan \frac{2}{1/\sqrt{\phi}-1} \frac{A_P^*}{A} \quad (4)$$

In some embodiments, the cone angle is at least 5°, at least 10°, or at least 15°, at least 20°, at least 30°, or at least 40°. In certain embodiments, the cone angle is less than or equal to 50°, less than or equal to 40°, less than or equal to 30°, less than or equal to 20°, or less than or equal to 10°. Combinations of these ranges are also possible (e.g., 10-20°, inclusive, or 10-50°). For example, in FIG. 2, cone angle 293 is shown. As used herein, the cone angle is the smallest angle of a cone encompassing all of the transmitted droplets.

In some embodiments, the meshes, articles, systems, and/or methods disclosed herein unexpectedly allow for delivery of smaller droplets (e.g., sub-millimetric droplets) (which can be useful, in some cases, to prevent damage to the intended target (e.g., a plant)), an increased impact area, and/or reduced drift.

In some embodiments, the mesh is positioned at an angle of at least 1 degree, at least 10 degrees, at least 20 degrees, at least 30 degrees, at least 40 degrees, at least 45 degrees, at least 50 degrees, at least 60 degrees, at least 70 degrees, or at least 80 degrees relative to a line perpendicular to the direction of gravity. In certain embodiments, the mesh is positioned at an angle of less than or equal to 90 degrees, less than or equal to 80 degrees, less than or equal to 70 degrees, less than or equal to 60 degrees, less than or equal to 50 degrees, less than or equal to 45 degrees, less than or equal to 40 degrees, less than or equal to 30 degrees, less than or equal to 20 degrees, or less than or equal to 10 degrees relative to a line perpendicular to the direction of gravity. Combinations of these ranges are also possible (e.g., between 1 degree and 90 degrees or between 1 and 45 degrees). For example, in FIG. 2, mesh 100 is positioned at angle 230 relative to line 231 (which is perpendicular to the direction of gravity).

Systems comprising meshes (e.g., any of the meshes described herein) are also provided.

Figure 1C:
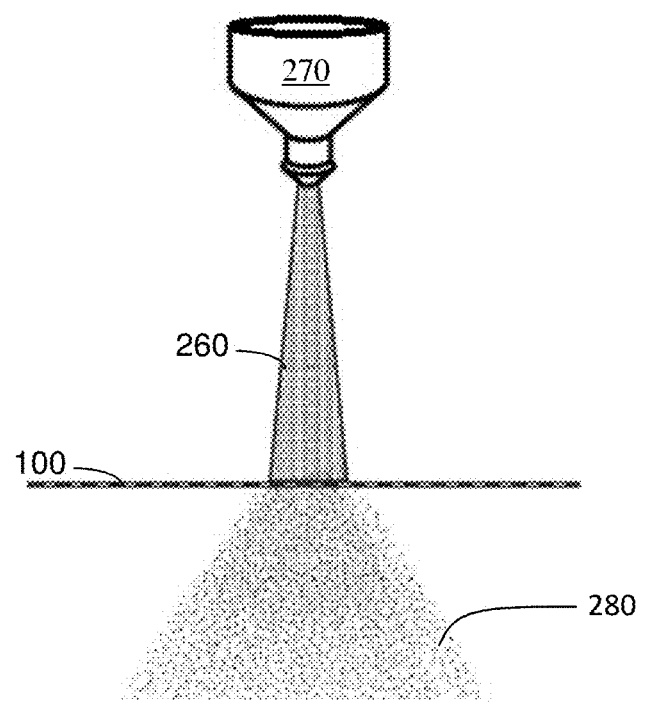
FIG. 1C is, in accordance with certain embodiments, a system comprising a source and a mesh.
Figure 1D:
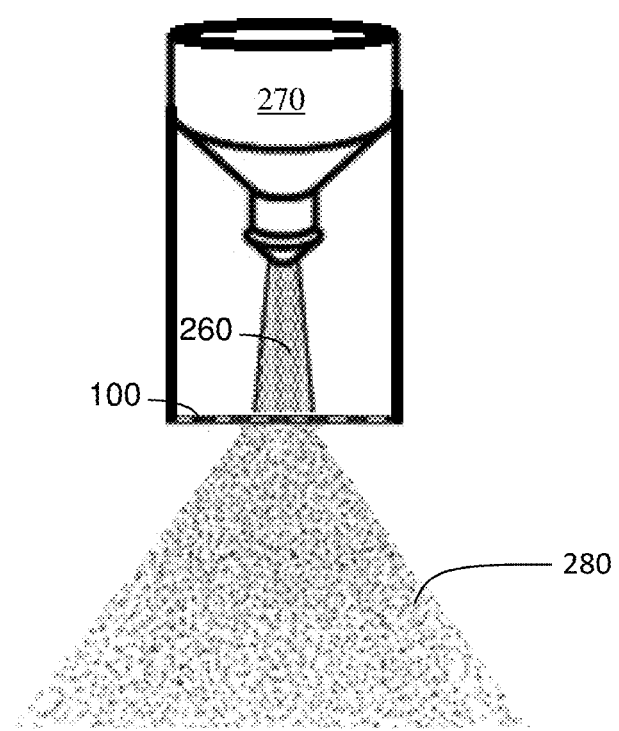
FIG. 1D is, in accordance with certain embodiments, a system comprising a source and a mesh.

In certain embodiments, the system comprises a source of droplets (e.g., millimetric droplets). For example, in FIGS. 1C, 1D, and 2, the system comprises source 270. Non-limiting examples of sources include reservoirs, containers (open to the air or enclosed), pipes, and/or natural bodies of water.

In some embodiments, the mesh is spatially separated from the source of the droplets (e.g., millimetric droplets). For example, in FIGS. 1C, 1D, and 2, mesh 100 is spatially separated from source 270. In certain cases, the source and the mesh are configured such that, when the droplets (e.g., millimetric droplets) move from the source through the openings of the mesh, at least a portion of the droplets (e.g., millimetric droplets) are fragmented into a plurality of smaller droplets (e.g., sub-millimetric droplets). For example, FIGS. 1C, 1D, and 2, source 270 and mesh 100 are configured such that when droplets 260 (e.g., millimetric droplets) move from source 270 through the openings of mesh 100, at least a portion of droplets 260 (e.g., millimetric droplets) are fragmented into a plurality of smaller droplets 280 (e.g., sub-millimetric droplets). In some instances, the source and the mesh are configured such that, when the droplets (e.g., millimetric droplets) move from the source through the openings of the mesh solely under a gravitational force of the earth, at least a portion of the droplets (e.g., millimetric droplets) are fragmented into a plurality of smaller droplets (e.g., sub-millimetric droplets).

In certain embodiments, the system comprises a vessel. For example, in FIG. 2, the system comprises vessel 250. In some instances, the vessel is configured to collect droplets (e.g., millimetric droplets) that do not move through the openings of the mesh. For example, in FIG. 2, vessel 250 is configured to collect droplets 260 (e.g., millimetric droplets) that do not move through the openings of mesh 100. In some embodiments, some of the droplets (e.g., millimetric droplets) move from the source through the openings of the mesh and some of the droplets (e.g., millimetric droplets) roll along the solid material of the mesh and into the vessel. For example, in FIG. 2, some of droplets 260 (e.g., millimetric droplets) move from source 270 through the openings of mesh 100 to form smaller droplets 280 (e.g., sub-millimetric droplets), and some of droplets 260 (e.g., millimetric droplets) move from source 270 to mesh 100, roll along the solid material of mesh 100, and into vessel 250.

Figure 3:
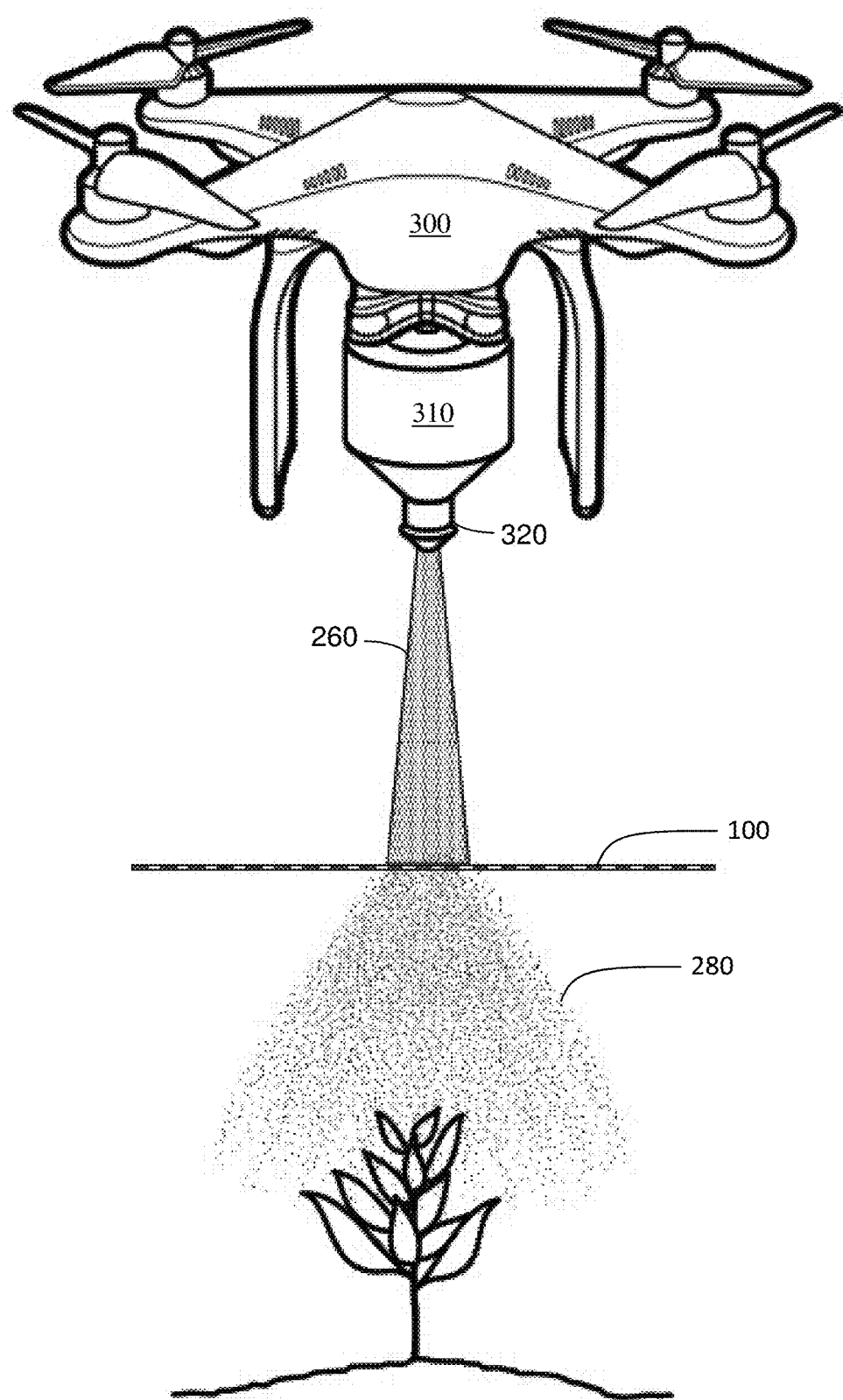
FIG. 3 is, in accordance with certain embodiments, a system comprising an unmanned aerial vehicle and a mesh.

In some embodiments, the system comprises an unmanned aerial vehicle. For example, in FIG. 3, the system comprises unmanned aerial vehicle 300 In certain cases, the unmanned aerial vehicle comprises a reservoir. For example, in FIG. 3, unmanned aerial vehicle 300 comprises reservoir 310. In some instances, the reservoir is configured to contain a liquid (e.g., water or pesticides). In certain embodiments, the unmanned aerial vehicle comprises a nozzle. For example, in FIG. 3, unmanned aerial vehicle 300 comprises nozzle 320. In some cases, the nozzle is in fluid communication with the reservoir. For example, in FIG. 3, nozzle 320 is in fluid communication with reservoir 310. In certain instances, the nozzle is configured to generate a spray comprising a plurality of droplets (e.g., millimetric droplets) from the liquid. For example, in FIG. 3, nozzle 320 is configured to generate a spray comprising a plurality of droplets 260 (e.g., millimetric droplets).

Figure 4:
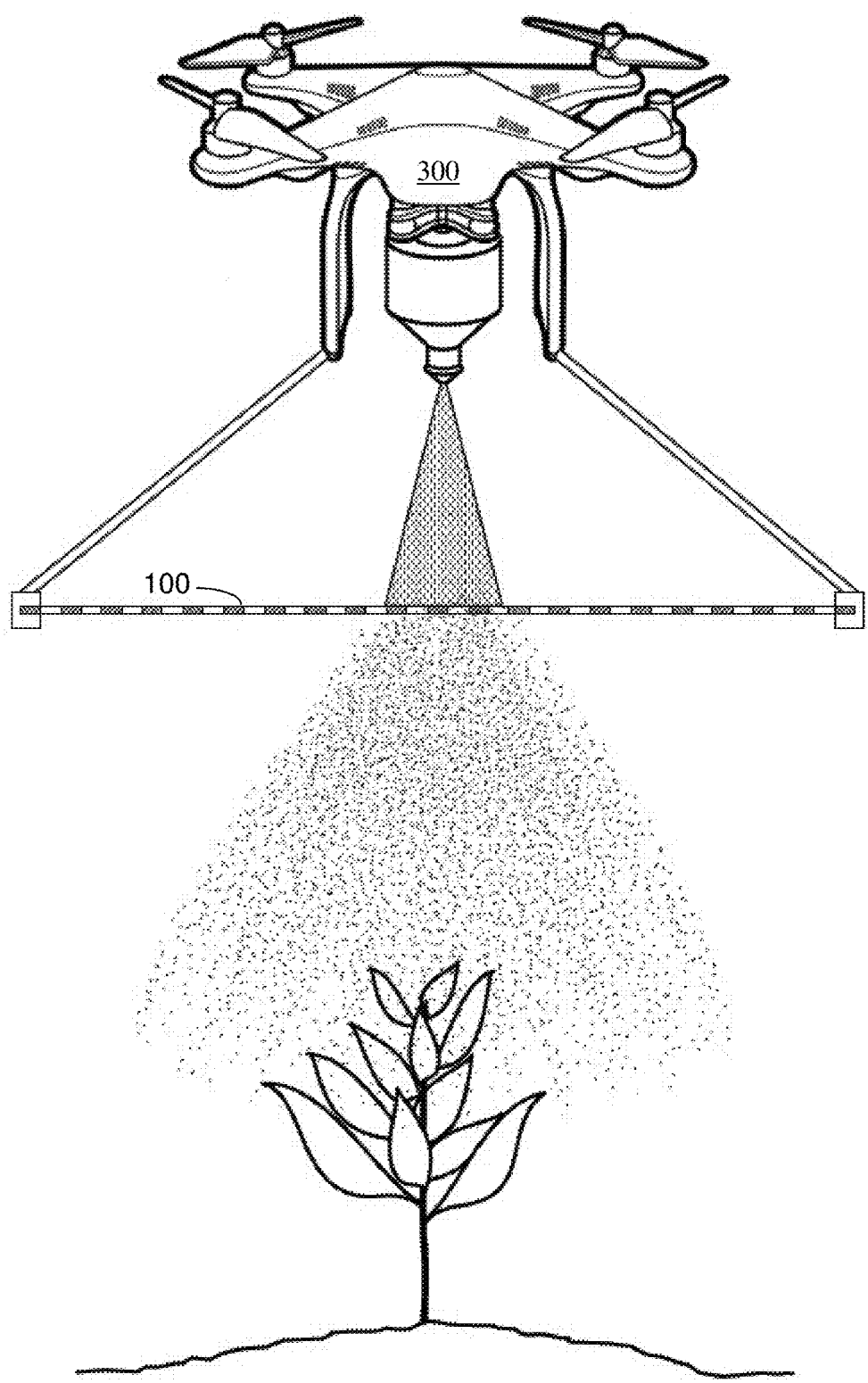
FIG. 4 is, in accordance with certain embodiments, a system comprising an unmanned aerial vehicle integrated with a mesh.

In some embodiments, the system comprises the unmanned aerial vehicle and the mesh. For example, in FIG. 3, the system comprises unmanned aerial vehicle 300 and mesh 100. In certain cases, the unmanned aerial vehicle and the mesh are integrated. For example, in FIG. 4, unmanned aerial vehicle 300 and mesh 100 are integrated. In some embodiments, the mesh is configured such that, when the plurality of droplets (e.g., millimetric droplets) move from the nozzle through the openings of the mesh, at least a portion of the plurality of droplets (e.g., millimetric droplets) are fragmented into a plurality of smaller droplets (e.g., sub-millimetric droplets). For example, in FIG. 3, mesh 100 is configured such that, when the plurality of droplets 260 (e.g., millimetric droplets) move from nozzle 320 through the openings of mesh 100, at least a portion of the plurality of droplets 260 (e.g., millimetric droplets) are fragmented into a plurality of smaller droplets 280 (e.g., sub-millimetric droplets). In certain embodiments, the mesh is configured such that, when the plurality of droplets (e.g., millimetric droplets) move from the nozzle through the openings of the mesh solely under a gravitational force of the earth, at least a portion of the plurality of droplets are fragmented into a plurality of smaller droplets (e.g., sub-millimetric droplets).

Certain aspects are related to methods.

In some embodiments, the method comprises generating droplets (e.g., millimetric droplets).

In certain embodiments, the method comprises transporting at least a portion of the droplets (e.g., millimetric droplets) through a mesh. For example, in FIGS. 1C, 1D, and 2, at least a portion of droplets 260 (e.g., millimetric droplets) are transported through mesh 100. In certain instances, the mesh is a mesh described herein. In some cases, the transporting at least a portion of the droplets (e.g., millimetric droplets) through the mesh breaks up at least a portion of the droplets (e.g., millimetric droplets) into smaller droplets (e.g., sub-millimetric droplets). For example, in FIGS. 1C, 1D, and 2, transporting at least a portion of droplets 260 (e.g., millimetric droplets) through mesh 100 breaks up at least a portion of droplets 260 (e.g., millimetric droplets) into smaller droplets 280 (e.g., sub-millimetric droplets). In certain cases, the transporting at least a portion of the droplets (e.g., millimetric droplets) through the mesh comprises transporting at least a portion of the droplets (e.g., millimetric droplets) through the mesh solely under a gravitational force of the earth.

Figure 5:
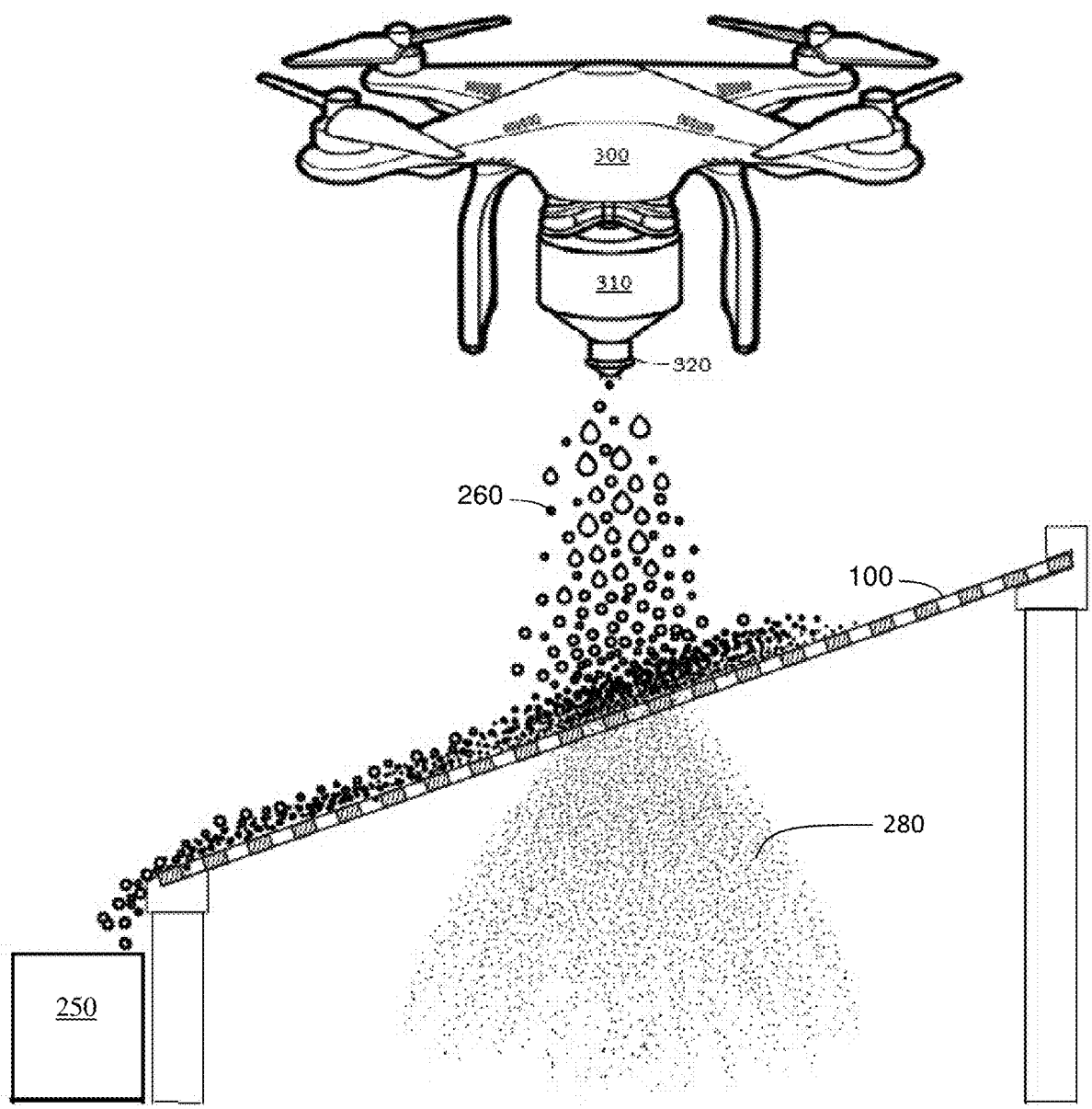
FIG. 5 is, in accordance with certain embodiments, a system comprising an unmanned aerial vehicle, a mesh, and a vessel.

In some embodiments, the method comprises collecting at least a portion of droplets (e.g., millimetric droplets) that were not transported through the mesh. In certain embodiments, the method comprises collecting at least a portion of droplets (e.g., millimetric droplets) that were not transported through the mesh in a vessel. For example, in FIG. 2, at least a portion of droplets 260 (e.g., millimetric droplets) that were not transported through mesh 100 are collected in vessel 250. As another example, in FIG. 5, at least a portion of droplets 260 (e.g., millimetric droplets) that were not transported through mesh 100 are collected in vessel 250. In some cases, the collecting at least a portion of droplets (e.g., millimetric droplets) that were not transported through the mesh comprises collecting at least a portion of droplets (e.g., millimetric droplets) that rolled along the solid material of the mesh and into the vessel.

Figure 6:
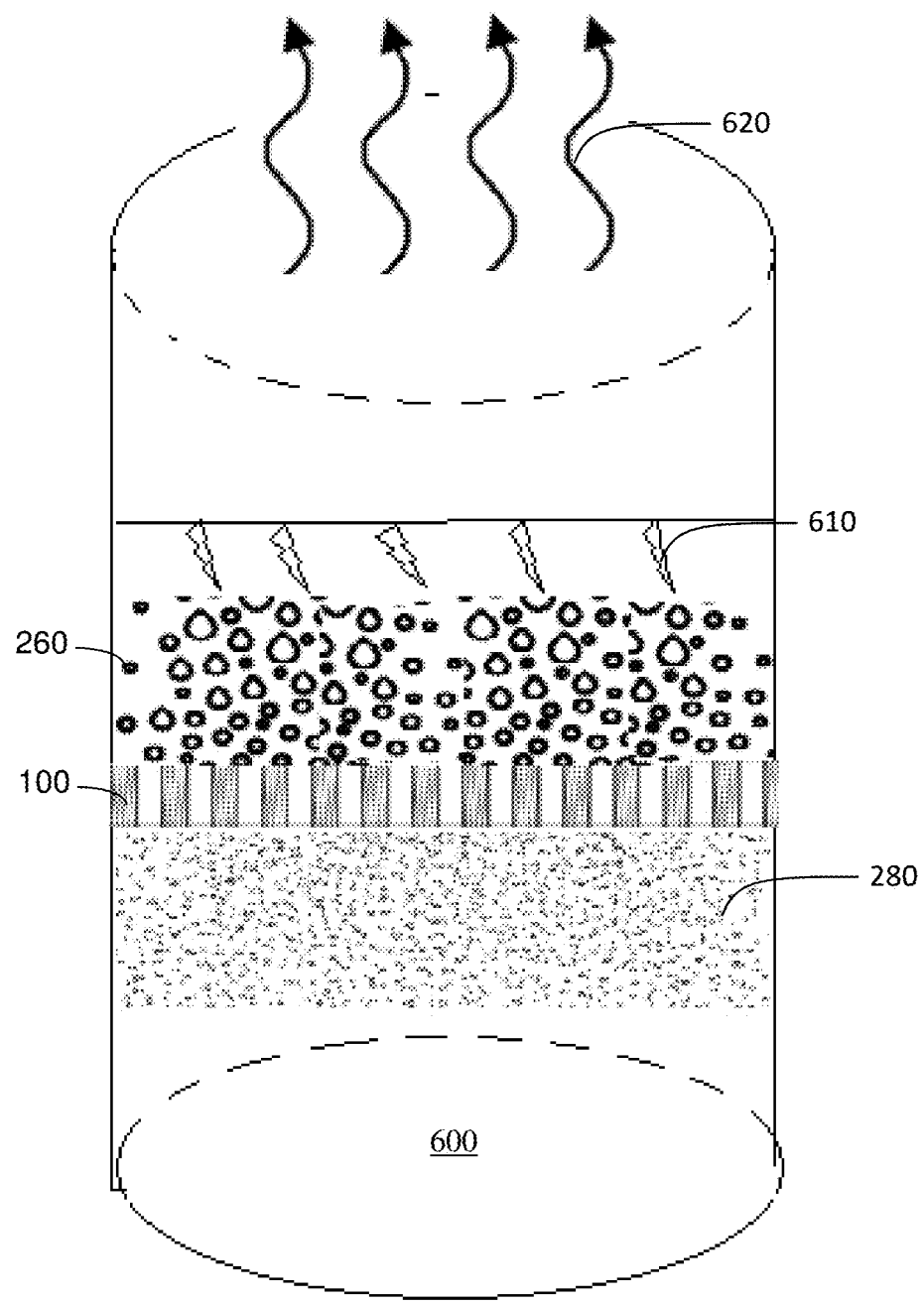
FIG. 6 is, in accordance with certain embodiments, a system comprising a cooling tower and a mesh.
Figure 7:
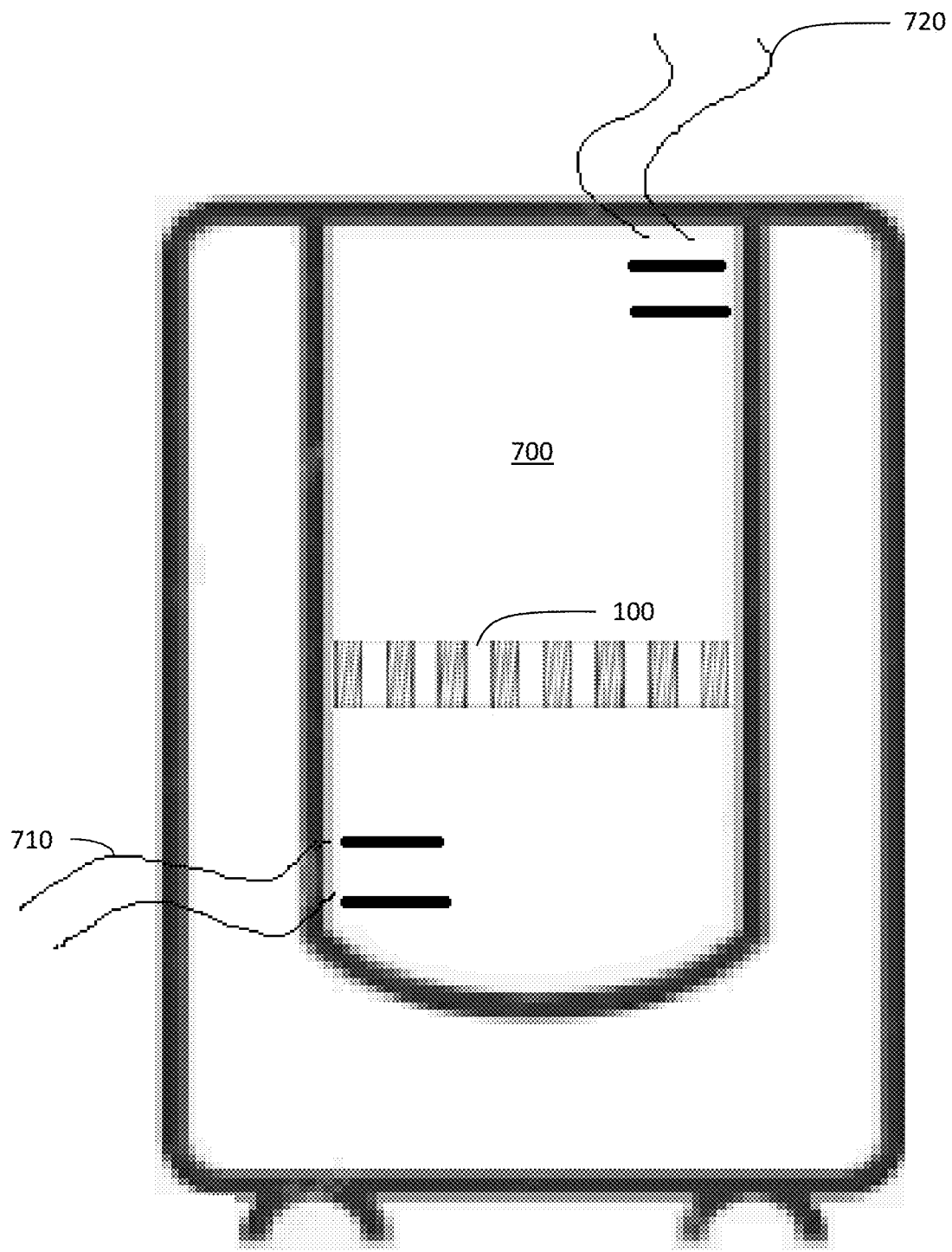
FIG. 7 is, in accordance with certain embodiments, a system comprising a humidifier and a mesh.
Figure 8:
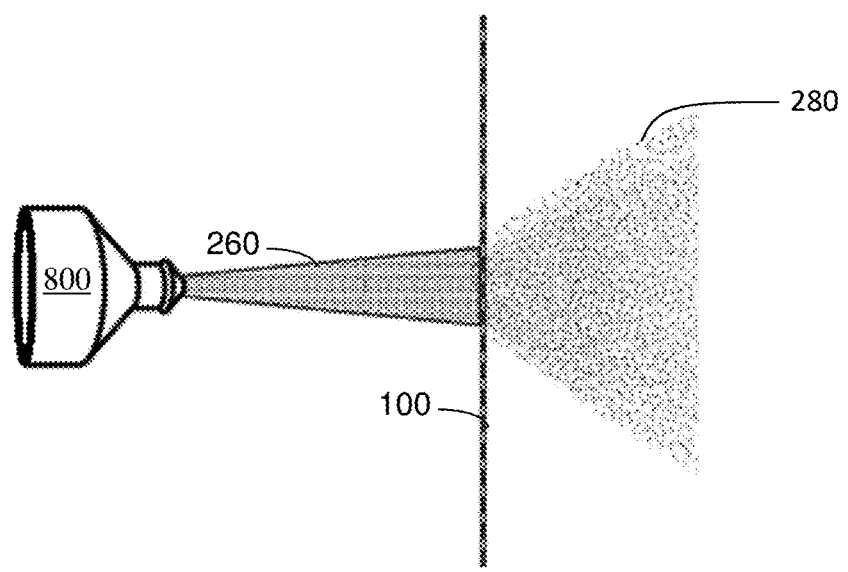
FIG. 8 is, in accordance with certain embodiments, a system comprising a paint spraying system and a mesh.

In some embodiments, the meshes, articles, systems, and/or methods described herein can be used for, are part of, and/or are integrated with an agricultural system, a cooling tower, a paint spraying system, and/or a humidifier. For example, in FIG. 2, mesh 100 is integrated with an agricultural system (see, e.g., plant 210). As another example, in FIG. 6, mesh 100 is integrated with cooling tower 600, which has sprayers 610 and results in evaporation 620 through the higher evaporative flux of smaller droplets 280 (e.g., sub-millimetric droplets) compared to droplets 260 (e.g., millimetric droplets). As a further example, in FIG. 7, mesh 100 is integrated with humidifier 700, such that air output 720 has more moisture than air input 710. As yet another example, in FIG. 8, mesh 100 is integrated with paint spraying system 800. In certain embodiments, the meshes, articles, systems, and/or methods described herein can be used for, are part of, and/or are integrated with coatings, electrical power generation, mining, waste treatment, desalination, medical, and meteorological systems.

As noted above, in certain embodiments, the meshes, articles, systems, and/or methods described herein break droplets into smaller droplets. In certain instances, breaking up droplets into smaller droplets allows for the spread of the fluid from which the droplets are made over a much larger area. In some cases, the meshes, articles, systems, and/or methods described herein break droplets into smaller droplets, reducing the momentum exerted by the droplet fluid on the target substrate by a factor of at least 2, at least 5, at least 10, at least 100, or at least 1,000. In certain instances, the meshes, articles, systems, and/or methods described herein break droplets into smaller droplets, which consequently promotes surface exchange phenomena, such as evaporation. In certain embodiments, the meshes, articles, systems, and/or methods described herein allow improved control over the size and/or characteristics of the droplets. In some embodiments, the meshes, articles, systems, and/or methods described herein provide fragmentation at a reduced cost. In certain embodiments, the meshes, articles, systems, and/or methods described herein do not require additional energy, beyond the gravitational force of the earth, to break droplets into smaller units.

U.S. Provisional Patent Application No. 62/725,134, filed Aug. 30, 3018, and entitled "Droplet Fragmentation Using a Mesh for Atomization Processes," is incorporated herein by reference in its entirety for all purposes The following examples are intended to illustrate certain embodiments of the present invention, but do not exemplify the full scope of the invention.

EXAMPLE 1

This example demonstrates how a drop can be fragmented into thousands of smaller droplets by impacting it onto a mesh. This example demonstrates the unexpected possibility to transfer liquid outside the projected impact area of the drop and the existence of a well-defined cone envelope for the resulting spray. Self-similarity of the flow studied at the primary repeating unit—the hole—allowed prediction of the global nature of the atomization process: mass transfer and spray geometry. This example explains how these elementary units capture the momentum of the flow atop them and how side wall interactions can lead to saturation effects. At the grid level, this translated into the surface fraction and hole aspect ratio being significant parameters of the system that could be tuned to control and enhance spray characteristics. As a result of the fragmentation, the momentum exerted on the target was reduced—a major advantage in crop protection and pathogen dispersion prevention under rain. In addition, in some cases, pesticide drift in agricultural sprays can be controlled by using initially large drops that are subsequently atomized and conically sprayed by a mesh atop the crop. Beyond droplet-substrate interaction, in some instances, this inexpensive spraying method enhances surface exchange phenomena such as evaporation and has major implications in many applications such as cooling towers or multi-effect desalination.

Breaking a given volume of liquid into smaller units—i.e. generating sprays—is of key importance for a wide variety of applications ranging from agriculture, coatings and paints, combustion engines, mining and waste treatment, medical and meteorology. The present example demonstrates that drops can be atomized by impact onto a mesh or hole, leading to the transmission of part of the liquid as a spray of droplets typically 1,000 times smaller than the original drop. In the present example, an unexpected transmission cone that can be tuned to control the sprayed area beneath the grid was formed. In this example—where the liquid had a binary choice: either pass through a hole or be deflected by a plain section of the mesh—the characteristics of the spray below the mesh were dictated by its geometrical parameters as well as by the local flow profile of the crashing drop. This memory of the flow across the mesh was studied by impacting a droplet on a plate with a single hole. By off-centering hole and droplet, the local flow at different positions was probed and parameters governing the direction of the ejected liquid filaments (dictating the shape of the transmitted cone for a mesh) and the amount of transferred mass, two quantities relevant for industrial applications, were identified. Using a model, a critical hole aspect ratio below which thickness can be neglected and above which liquid rebound effects with side walls should be taken into account was defined. Transmitted mass was then measured and modeled, highlighting the ability of a drop to transfer liquid even outside the area below its projected area. Extrapolating these single hole results to the case of multiple holes demonstrates the more complex case of a mesh—seen as a combination of single holes—where the surface fraction of holes is found to dominate the transmission process.

Impact of droplets onto the mesh was studied as follows. A millimetric water drop (radius R, density $\rho$ and surface tension $\gamma$) impacting at a speed V of several meters per second onto a non-wetting mesh (made of woven wire of diameter d and open sections of characteristic size b, of hundreds of microns) is illustrated in FIG. 9A.

Figure 9A:
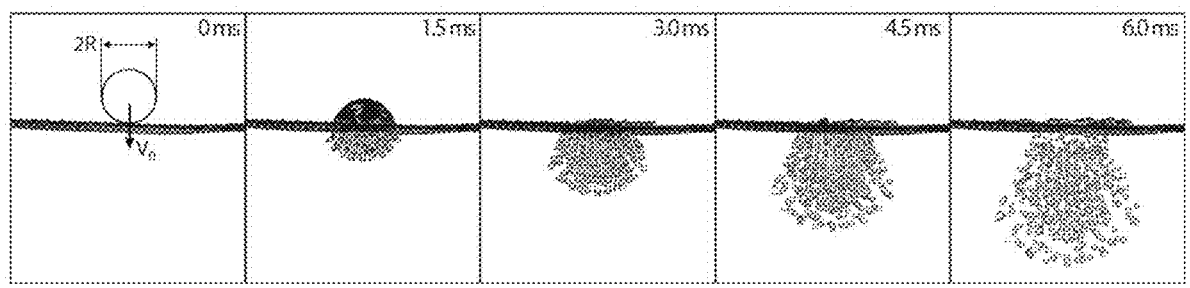
FIG. 9A is, in accordance with certain embodiments, time lapse images of a water droplet impinging on a mesh.
Figure 9B:
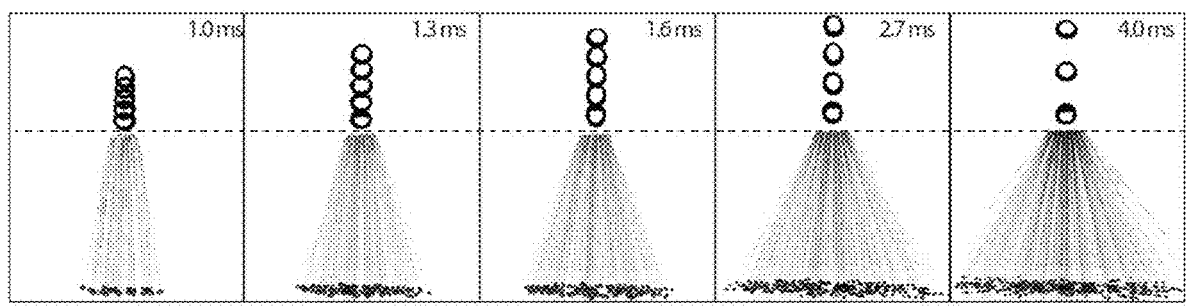
FIG. 9B is, in accordance with certain embodiments, chronophotography of a droplet impinging on a mesh.

FIG. 9A shows, in accordance with certain embodiments, time lapse images of a water droplet of radius R=1.9 mm impacting at V=1.6 m/s onto a non-wetting mesh (mesh number #46 and surface fraction $\phi$=0.48 corresponding to holes of radius b=190 µm and wire diameter d=170 µm). The time between images was 1.5 ms. FIG. 9B shows, in accordance with some embodiments, chronophotography of a droplet impacting on the same mesh as FIG. 9A (represented by the dashed line) for speeds V=1.0, 1.3, 1.6, 2.7, 4 m/s, increasing from left to right. The time interval between drops before impact (region above the mesh) was 2 ms in all cases. The third image corresponds to FIG. 9A.

An initial volume (~30 µL) was divided into droplets (~0.03 µL) one thousand times smaller when liquid was forced through the holes of the grid. Since the time taken by the drop to flatten—which scales as $\tau \sim 2R/V \sim 3$ ms—was larger than the Rayleigh-Plateau time—which scales as $\sqrt{\rho b^3/\gamma} \sim 0.3$ ms—liquid filaments destabilized into tiny droplets forming a conical spray where edges were defined by the angle of ejection $\alpha$.

FIG. 9B shows a chronophotography of how this envelope depended on the impacting speed and resulted in the spreading of the grated droplets over an area bigger than the original projected area of the drop. While the meshes used in this study were non-wetting, the behavior of drops impacting on plain meshes is similar. In order to understand the elements governing the relative amount of transferred mass $m/m_0$ ($m_0$ and m being the initial and transmitted mass respectively) and the angle of ejection $\alpha$,—crucial in many applications—the case of a drop impacting on a single hole was studied.

The impact of a droplet on a single hole with ejection angle $\alpha$ was studied. When a drop impacted a non-wetting plate of thickness h pierced with a hole of radius b off-centered by a distance r from the axis of symmetry of the drop (see FIG. 10A) an equivalent behavior was observed. If impacting speed V was greater than the critical speed $$V^* = 2\sqrt{\gamma/\rho b}$$

—set by the balance between inertial $\rho V^2$ and capillary $\gamma/b$ pressure—liquid could be pushed through the hole. Indeed, the Capillary number, $Ca=\mu V/\sigma$, was below 0.1 for all the velocities considered, indicating that viscosity can be neglected against capillary forces.

Figure 10A:
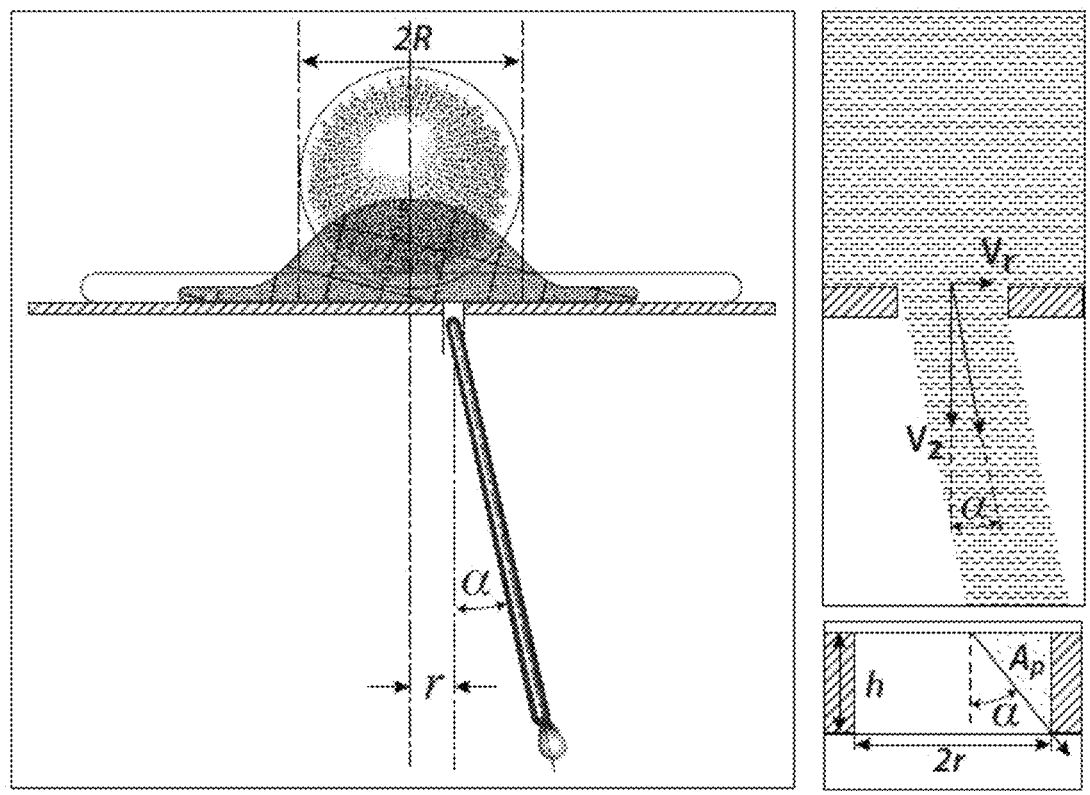
FIG. 10A is, in accordance with certain embodiments, chronophotography of a droplet impinging on a mesh.
Figure 10B:
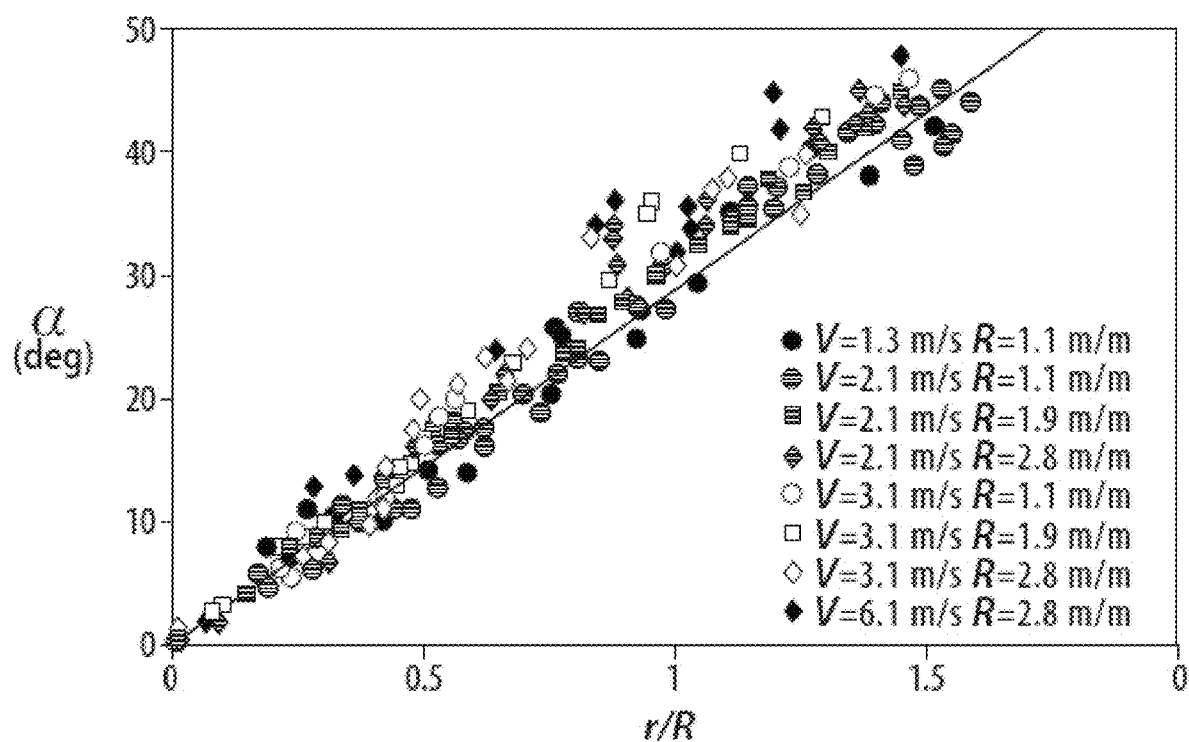
FIG. 10B is, in accordance with certain embodiments, a graph of the angle of ejection α of a droplet on a single hole mesh as a function of the normalized off-centering position of the hole of the mesh when speed V and drop radius R were varied.
Figure 10C:
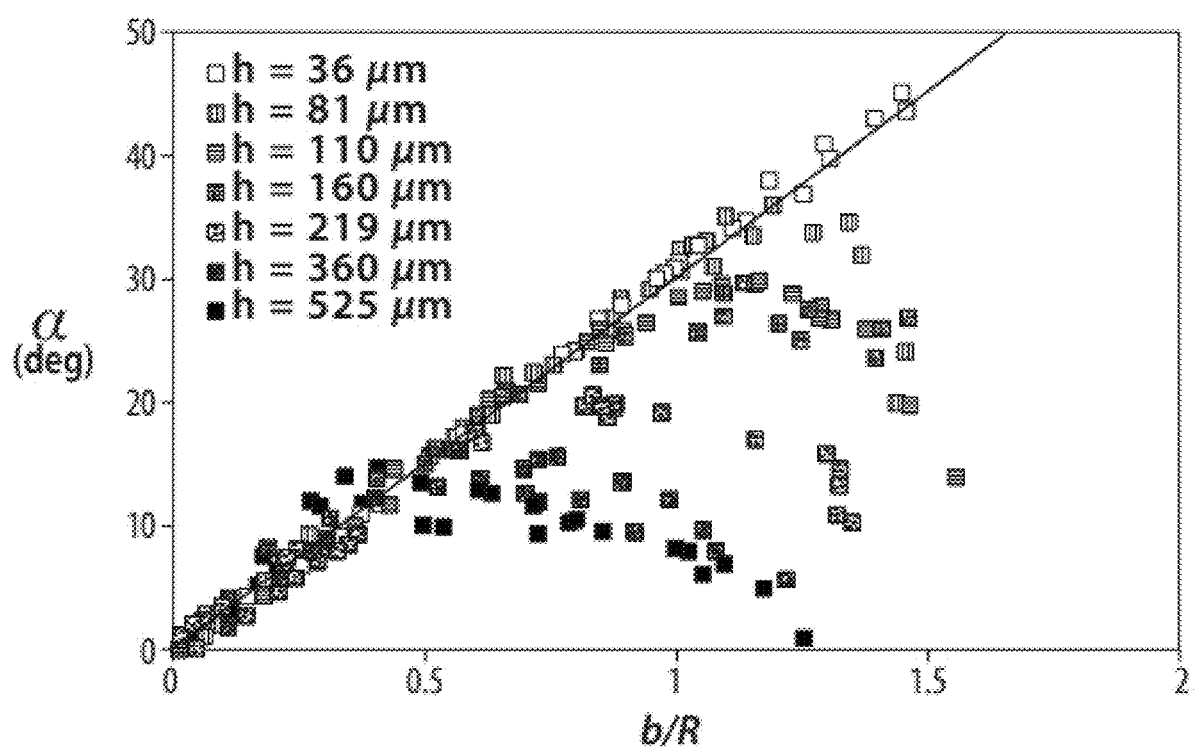
FIG. 10C is, in accordance with certain embodiments, a graph of the angle of ejection α of a droplet on a single hole mesh as a function of the normalized off-centering position of the hole of the mesh when plate thickness h was varied.
Figure 10D:
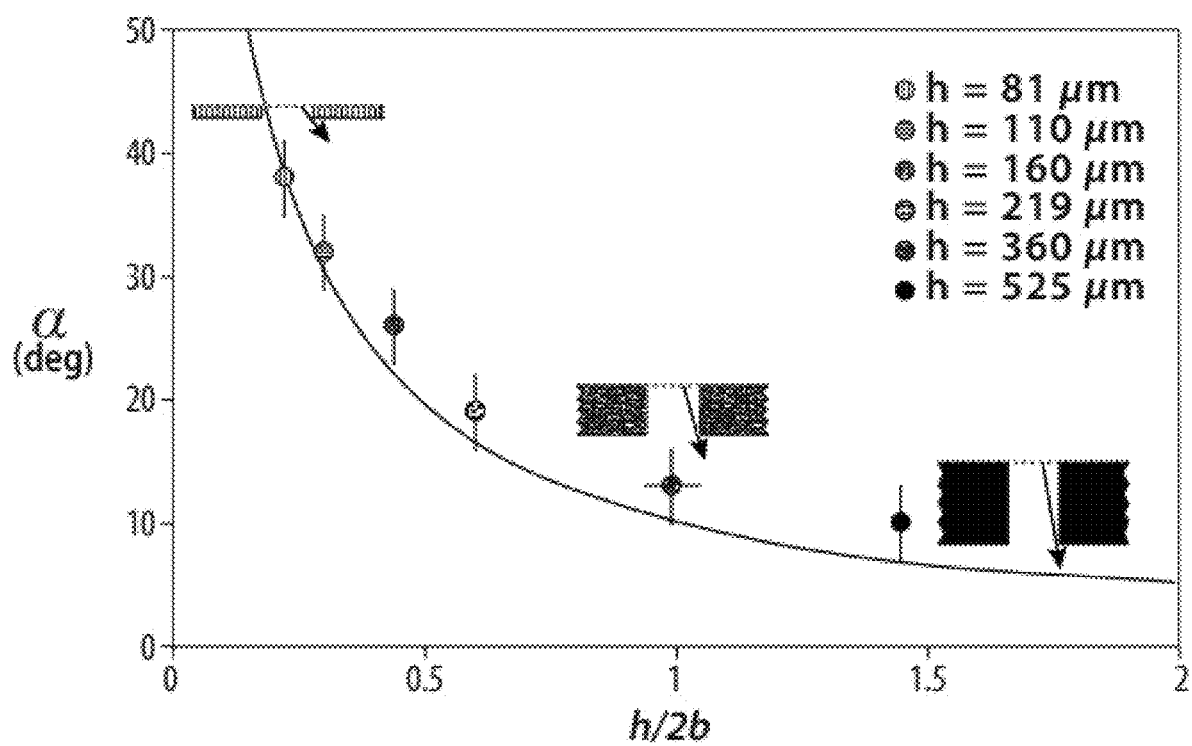
FIG. 10D is, in accordance with certain embodiments, a graph of critical angle α* of a droplet on a single hold mesh as a function of the hole aspect ratio h/2b.

FIG. 10A shows, in accordance with certain embodiments, chronophotography of a droplet (R=1.1 mm, V=2.1 m/s) impacting a plate of thickness h=36±5 µm pierced with a hole of radius b=180±10 µm at an off-centered position r=0.44R. A liquid filament ejected at an angle $\alpha$ was observed. The right top panels show a zoomed sketch of the hole area. The right bottom panel shows a cross section sketch of the hole. FIG. 10B and FIG. 10C show, in accordance with certain embodiments, the angle of ejection $\alpha$ as a function of the normalized off-centering position of the hole r/R. The black line shows Eq. 1. The hole radius (b) was 180±10 µm. In FIG. 10B, speed V and drop radius R were varied while plate thickness h=36±5 µm was kept constant. In FIG. 10C, speed (V=2.1 m/s) and drop radius (R=1.9 mm) were kept constant while plate thickness h was varied. FIG. 10D shows, in accordance with certain embodiments, critical angle $\alpha^*$ as a function of the hole aspect ratio h/2b. The solid line shows Eq. 2 with $A_p/A^*$=10%. The sketches show the real hole aspect ratio for fixed radius b=180±10 µm and thickness h=81, 160, and 525 µm. The arrow in the sketch shows $\alpha^*$ and divides the cross section of the hole so that the perturbed area corresponds to 10%. Assuming an hyperbolic flow profile for the flow in the crashing drop, the integral form of the incompressibility expression gave a relation between vertical $V_z$ and horizontal $V_r$ components of the speed (see FIG. 10A):

$$V_r = -\frac{r}{2}\frac{\partial V_z}{\partial z}.$$

Since the angle of ejection was set by the ratio of these speeds $\alpha=\arctan V_r/V_z$, the following scaling law was obtained:

$$\alpha \sim \frac{r}{2R} \quad (1)$$

where R was the vertical length-scale and the small angles approximation was assumed as tan x~x. To experimentally confirm Eq. 1, FIG. 10B compared the angle of ejection $\alpha$ for different speeds V∈1.3, 2.1, 3.1, 6.1 m/s and drop radius R∈1.1, 1.9, 2.8 mm. As predicted, a linear dependence of $\alpha$ versus the off-centering distance normalized by the natural length-scale of the droplet r/R and an invariance versus the velocity V was observed. All experiments in FIG. 10B were conducted with a hole of high aspect ratio where the horizontal dimension (2b=360±20 µm) was one order of magnitude greater than the vertical one (h=36±5µm) so that any thickness effect could be neglected and an infinitely thin plate could be assumed. To investigate the role of thickness, in FIG. 10C the angle of ejection as a function of r/R for increasing thickness h, keeping V=2.1 m/s and R=1.9 mm fixed is shown. In this case, the appearance of a critical saturation angle $\alpha^*$ defined as the angle for which data start to deviate from the infinitely thin plate model was observed. To understand this saturation, a cross-sectional area $A_p$=1/$2h^2$ tan $\alpha$ was defined, (shown in bottom right panel in FIG. 10A) where the trajectories of the fluid particles entering the hole would intersect with the side walls and be perturbed. The ratio of the perturbed to total area A=2bh was hence: $A_p/A$=tan $\alpha$h/4b. If there was a high aspect ratio hole (h≪b), $A_p/A\to 0$, it was in the infinitely thin plate regime. In the opposite case, $A_p/A\to 1$, all the fluid could be assumed to be perturbed by the wall thickness. With this simple definition, a critical value of perturbed fluid percentage $A_p/A^*$ over which it starts to deviate from the infinitely thin plate regime could be defined:

$$\alpha^* = \arctan\frac{4b}{h}\frac{A_p^*}{A} \quad (2)$$

To compare this model with the data shown in FIG. 10D $\alpha^*$ as a function of the hole's aspect ratio h/2b. Eq. 2 (line) shows best experimental agreement for $$\frac{A_p^*}{A} = 0.1$$

(fixed value for all data). As a result, the infinitely thin plate approximation was valid only for perturbed areas smaller than 10%. In addition, Eq. 2 allowed prediction of the saturation value $\alpha^*\approx 63°$ for the mesh used in FIG. 10A and validation of the use of the infinitely thin plate model in Eq. 1. The overall trend ejection angle after deviating from the linear behavior could be explained by assuming an elastic rebound against the lateral walls: the perturbed liquid amount would first saturate the ejection angle and then it would overcome it, leading to a decrease as showed in FIG. 10C.

Additionally, in FIG. 10, although transmission was possible outside the projected area of the droplet (see data for r>R) there was an off-centering distance upon which liquid transfer ceased (no data for r>1.5 R). In order to investigate what sets these transitions, the measure of the transmitted mass developed was studied in the next section.

The mass transfer upon impact of a droplet on a single hole was studied. Transmitted mass through a single hole was measured with a high sensitivity microbalance (1 µg resolution). In the case of a centered impact r=0, drop and holes sizes were varied as well as impacting speed. Since it took a time $\tau\sim 2R/V$ for the drop to crash, the total volume transferred was $Q\tau$, where $Q=(V-V^*)\pi b^2$ was the volumetric flow through the hole. Indeed, if V* was interpreted as a Taylor-Culick retraction speed of the liquid finger formed at the hole exit, if V<V* no mass was transferred and if V>V*, liquid was transmitted at speed V−V*. As a result, the relative amount of transmitted mass could be expressed as:

$$\frac{m}{m_0} = \frac{3}{2}\left(\frac{b}{R}\right)^2\left(1 - \frac{V^*}{V}\right) \quad (3)$$

When comparing this model to experiments (FIG. 11A), a collapse of the data over several orders of magnitude was observed, corresponding to masses ranging from tens of micrograms for the smallest drop, speed and hole size to thousands of micrograms in the opposite case. Although impacting speed had a strong effect in the vicinity of V*, once V»V*, relative mass transmission saturated to its maximum value set by the ratio of the hole to drop area $(b/R)^2$.

Figure 11A:
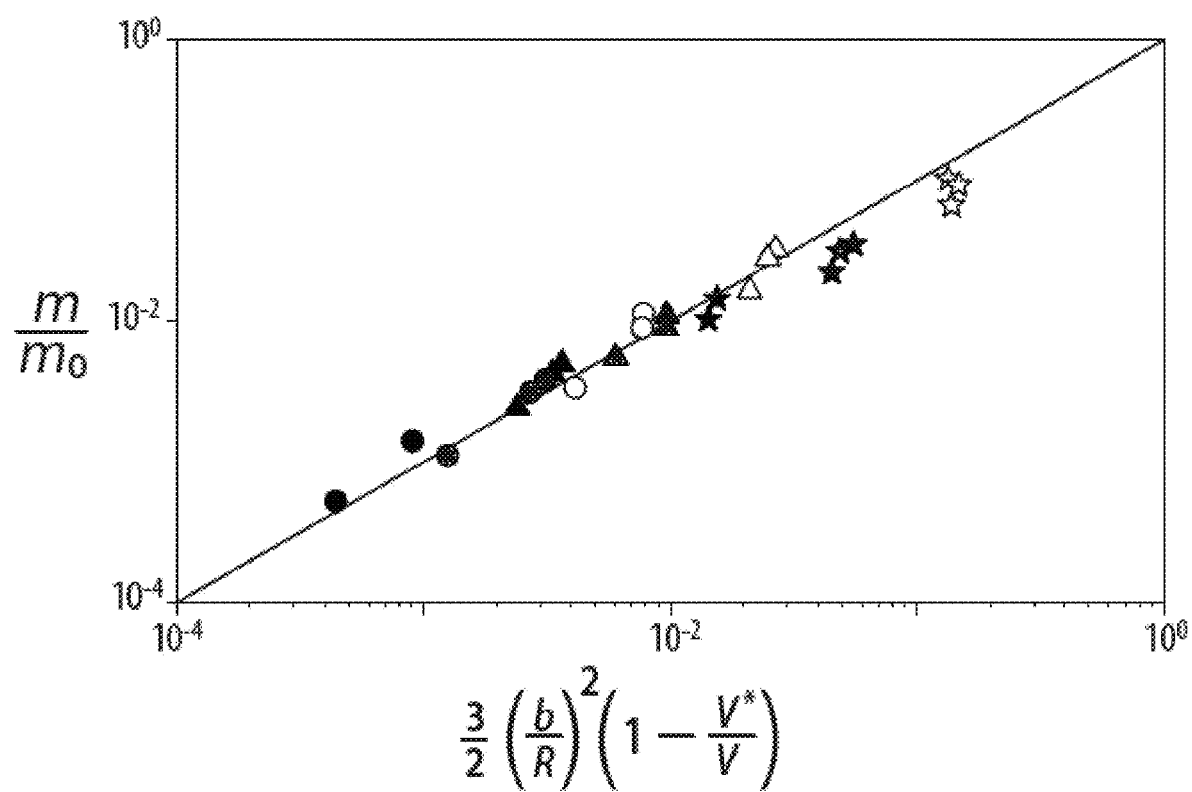
FIG. 11A is, in accordance with certain embodiments, a graph of the transmitted mass percentage as a function of the model prediction (Eq. 3) for centered holes r=0±0.2 mm.
Figure 11B:
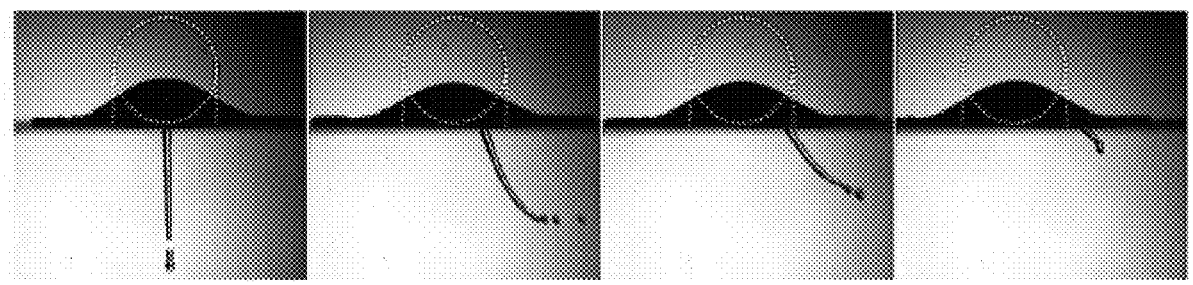
FIG. 11B is, in accordance with certain embodiments, a side view of a droplet impacting on a hole of a mesh with increasing off-centering parameter r/R: 0, 0.65, 0.95, 1.45 from left to right.

In FIG. 11B, the effect of the off-centering parameter r while keeping all other parameters constant can be observed. If r/R<1 (three first pictures), transmitted mass was similar to the centered case. If r/R>1 (last picture), mass was still transferred but rapidly decreased as off-centering increased. This effect was quantitatively shown in FIG. 11C where transmitted mass $m_r$ normalized by the centered case $m_{r=0}$ was plotted as a function of r/R. Although drop speed V, drop size R and hole size b were varied (so that $m_r$ ranges over two orders of magnitude: from tens to thousands of micrograms), rescaled transmission followed a similar behavior, owing to the self-similarity of the flow inside a crashing droplet. Furthermore, data could be divided into two domains. A first one, where the hole was under the projected area of the drop and transmission plateaued to a value similar to the centered scenario. In this case, it could be assumed that the local speed at the hole was similar to the impacting speed V. A second domain, where the hole was outside the projected area and, although transmission was still possible close to r≥R, it decreased rapidly with r. In this case, local speed at the hole was smaller due to the deceleration of the drop during spreading. In this study, a typical maximum value of $r_{max}/R≈1.5±0.2$ was observed, consistent with the ejection angle study (no measurable values for r greater than r/R=1.5). In order to get a more detailed model, an exact resolution of the local speed as a function of r would be needed, still an open problem.

Figure 11C:
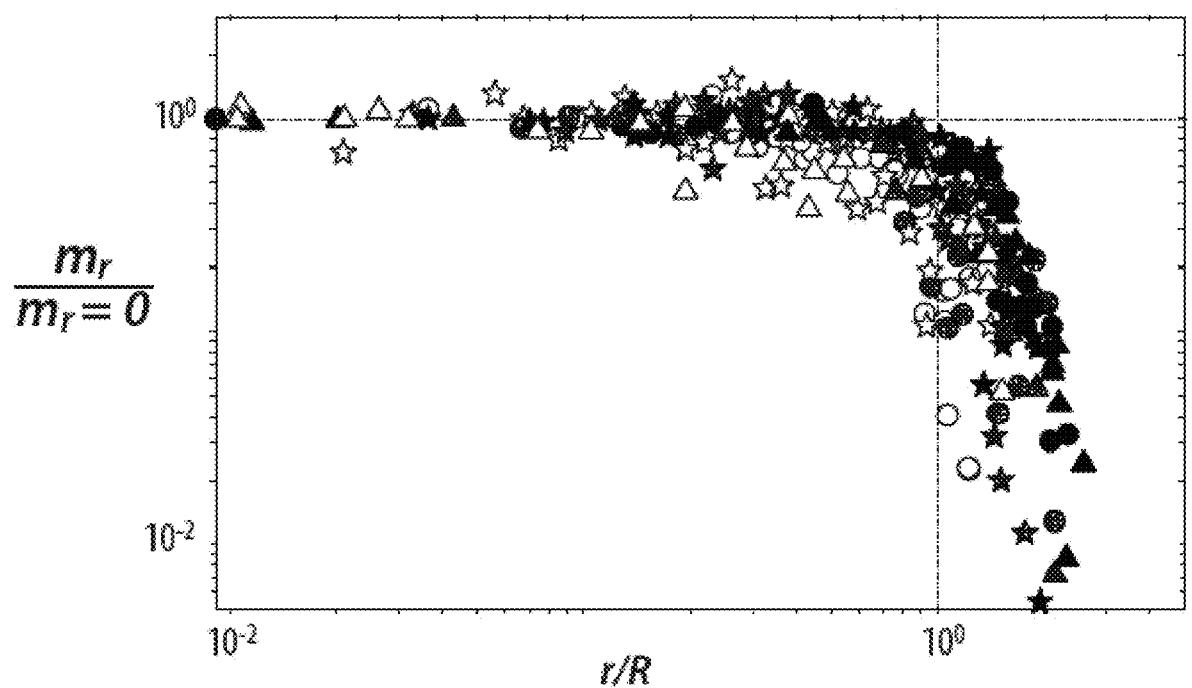
FIG. 11C is, in accordance with certain embodiments, a graph of transmitted mass $m_r$ as a function of the off-centering parameter r/R normalized by the center case $m_{r=0}$. $m_r$ ranged over two orders of magnitude: from tens to thousands of μg.

FIG. 11A shows, in accordance with certain embodiments, transmitted mass percentage as a function of the model prediction (Eq. 3) for centered holes r=0±0.2 mm. The marker type describes hole size b: 110±5 μm in circle, 180±10 μm in triangle, 320±10 μm in star. The color describes drop radius R: 1.1 mm in white, 1.9 mm in partially shaded black, 2.8 mm in black. For a given R and b, three speeds were used: 1.4, 2.5, and 3.4 m/s. The line shows equation y=x. FIG. 11B shows, in accordance with certain embodiments, a side view of a droplet (R=1.9 mm, V=2.2 m/s) impacting on a hole (b=180±10 μm) with increasing off-centering parameter r/R: 0, 0.65, 0.95, 1.45 from left to right. The image was taken 1.5 ms after initial touchdown in all cases. The white dashed line shows initial drop position and volume. FIG. 11C shows, in accordance with certain embodiments, transmitted mass $m_r$ as a function of the off-centering parameter r/R normalized by the center case $m_{r=0}$. $m_r$ ranged over two orders of magnitude: from tens to thousands of μg. The same marker and color definition were used as in FIG. 11A. The vertical dashed line shows r/R=1 after which rapid decrease of liquid transfer was observed. The horizontal dashed line shows maximum transmission happening when r=0—the case shown in FIG. 11A.

The impact of a droplet on a mesh with multiple holes was studied. With the understanding of the governing mechanisms at primary unit level—the hole—the more complex case of the mesh could be studied. A range of meshes were studied, for which the drop size was typically 10-100 times greater than the holes size so that the findings of a single hole could be extrapolated to it. Indeed, if the drop saw too few holes, i.e. the size of the open or closed areas were similar or greater than the size of the drop (d+2b)/2R~1, b being the distance between wires making the woven mesh and d their diameter, see FIGS. 12A-12B), it was closer to the case of a drop impacting a fiber or a plate. If it saw too many holes, (d+2b)/2R«1, additional effects came into play such as hydrodynamic focusing or water hammer pressure. In terms of number of holes per inch, # (or mesh number), a parameter conventionally used to describe meshes together with the open area fraction $\phi=1/(1+d/2b)^2$, this translated into a mesh number (#) ranging from 20 to 200, values corresponding to what is most generally used in industrial and commercial applications.

Figure 12A:
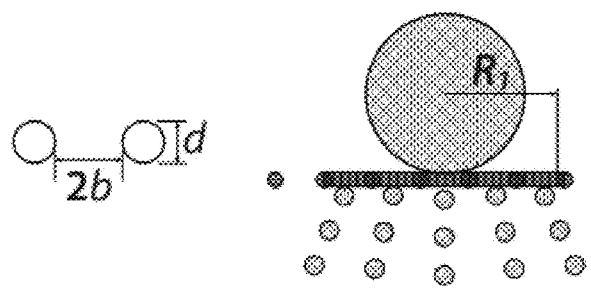
FIG. 12A is, in accordance with certain embodiments, an illustration of a side view of a drop-mesh system.
Figure 12B:
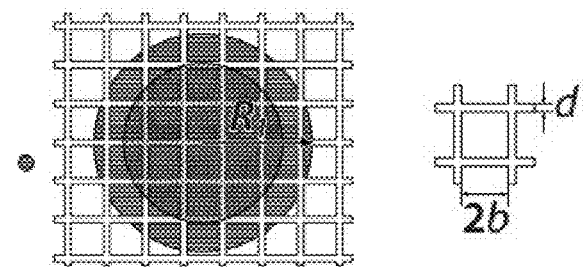
FIG. 12B is, in accordance with certain embodiments, an illustration of a top view of a drop-mesh system.
Figure 12C:
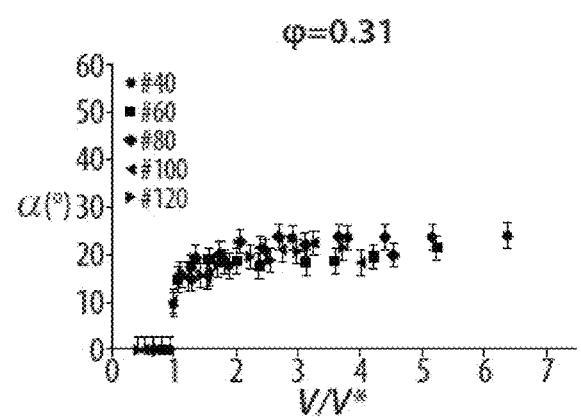
FIG. 12C is, in accordance with certain embodiments, the angle of ejection for a droplet (R=2.1 mm) impacting a mesh of constant surface fraction of holes (ϕ=0.31) as a function of normalized impacting speed.
Figure 12D:
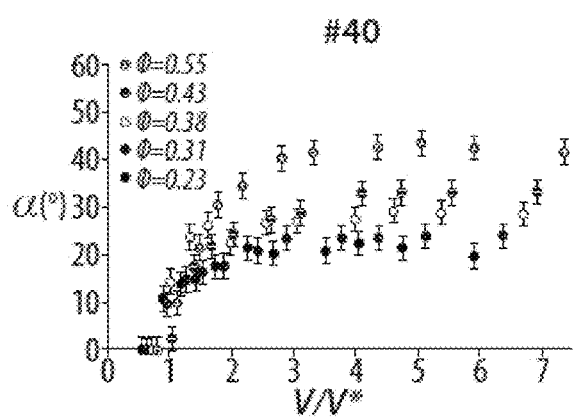
FIG. 12D is, in accordance with certain embodiments, the angle of ejection for a droplet (R=2.1 mm) impacting a mesh of constant mesh number (#=40) as a function of normalized impacting speed.
Figure 12E:
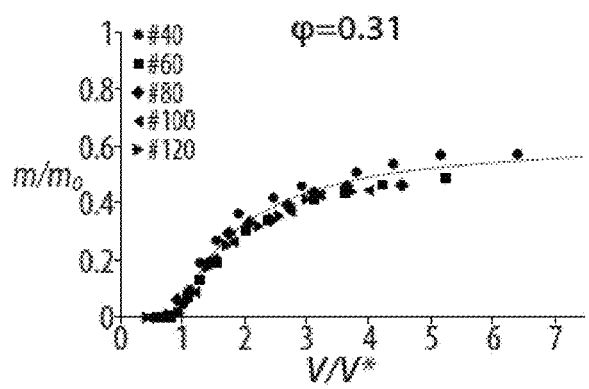
FIG. 12E is, in accordance with certain embodiments, the transmitted mass percentage for a droplet (R=2.1 mm) impacting a mesh of constant surface fraction of holes (ϕ=0.31) as a function of normalized impacting speed.
Figure 12F:
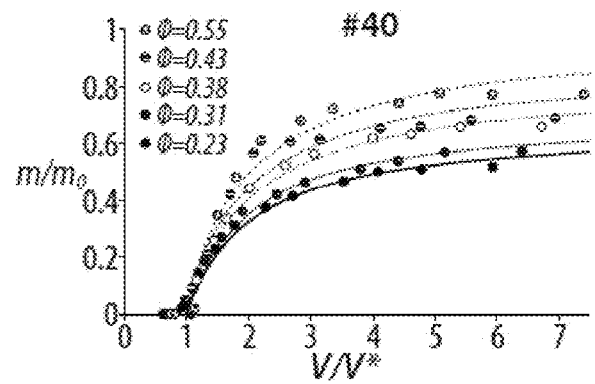
FIG. 12F is, in accordance with certain embodiments, the transmitted mass percentage for a droplet (R=2.1 mm) impacting a mesh of constant mesh number (#=40) as a function of normalized impacting speed.

FIG. 12A shows, in accordance with certain embodiments, a side sketch of a drop-mesh system. The insets show close up view detail of geometrical parameters of the grid. FIG. 12B shows, in accordance with certain embodiments, a top sketch of a drop-mesh system. The insets show close up view detail of geometrical parameters of the grid. FIG. 12C is, in accordance with certain embodiments, the angle of ejection for a droplet (R=2.1 mm) impacting a mesh of constant surface fraction of holes (φ=0.31) as a function of normalized impacting speed. FIG. 12D is, in accordance with certain embodiments, the angle of ejection for a droplet (R=2.1 mm) impacting a mesh of constant mesh number (#=40) as a function of normalized impacting speed. FIG. 12E is, in accordance with certain embodiments, the transmitted mass percentage for a droplet (R=2.1 mm) impacting a mesh of constant surface fraction of holes (φ=0.31) as a function of normalized impacting speed. FIG. 12F is, in accordance with certain embodiments, the transmitted mass percentage for a droplet (R=2.1 mm) impacting a mesh of constant mesh number (#=40) as a function of normalized impacting speed. In the case of mass transmission (FIGS. 12E-12F), solid lines show best fit following Eq. 5 (the resulting prefactor being 1.1±0.2).

Regarding cone angle α, it was observed in FIG. 12C that its variation appeared independent of the mesh number #, all curves saturating at a similar value of 19°. Since meshes were woven with circular wires (h=d), hole aspect ratio could be expressed as $h/2b=1/\sqrt{\phi}-1$. Using Eq. 2 the following was obtained:

$$\alpha^* \sim \arctan\frac{2}{1/\sqrt{\phi}-1}\frac{A_p^*}{A} \quad (4)$$

As a consequence, for a constant φ=0.31 a constant critical saturation angle α*=14° was expected. Although this value was close to the experimental one observed in FIG. 12C, it was lower due to the curved geometry of the woven grid hole's walls, a less constrained system than the modeled vertical walls used to establish Eq. 2. Symmetrically, if φ was increased while keeping mesh number constant (#=40, the case shown in top right FIG. 12D), saturation was pushed to higher values and the appearance of a dependency of a towards impacting speed V close to V* was observed. Since angle of ejection could be related back to an off-centering position, this means that for the case of fairly open meshes (see φ=0.55 in FIG. 12D, for which saturation around α*$_c$=42° was expected) the area over which mass was transmitted depended on impacting conditions.

In order to further investigate this dependency, the transfer mechanism was studied by measuring the transmitted mass (FIGS. 12E-12F) and constructing a simple model. If $R_t$ was defined as the radius of area over which liquid transfer occurred (shown in FIGS. 12A-12B) then there was $N_t$=φ$R_t^2$/$b^2$ transmitting holes. Using Eq. 3, the following was obtained for the mesh:

$$\frac{m}{m_0} \sim \left(\frac{R_t}{R}\right)^2 \phi \left(1 - \frac{V^*}{V}\right) \quad (5)$$

As observed in FIG. 12E, Eq. 5 predicted that transmission was independent of mesh number. In addition, similar to the single hole experiments, mass transfer increased with impacting speed until it reached a saturation value proportional to surface fraction φ and normalized transfer area $$\left(\frac{R_t}{R}\right)^2.$$

Using the observations for the single hole, $R_t$/R can be approximated by $r_{max}$/R≈1.5. As a result, a good agreement was observed with data in FIG. 12E where best fit following Eq. 5 is shown in solid line (the associated prefactor being 1.1±0.2). Again, although outside the scope of this example, a more detailed expression for the normalized transfer area would require an exact resolution of the local speed profile atop each hole (taking into account purging effects or dependency of $R_t$ towards V).

Figure 13A:
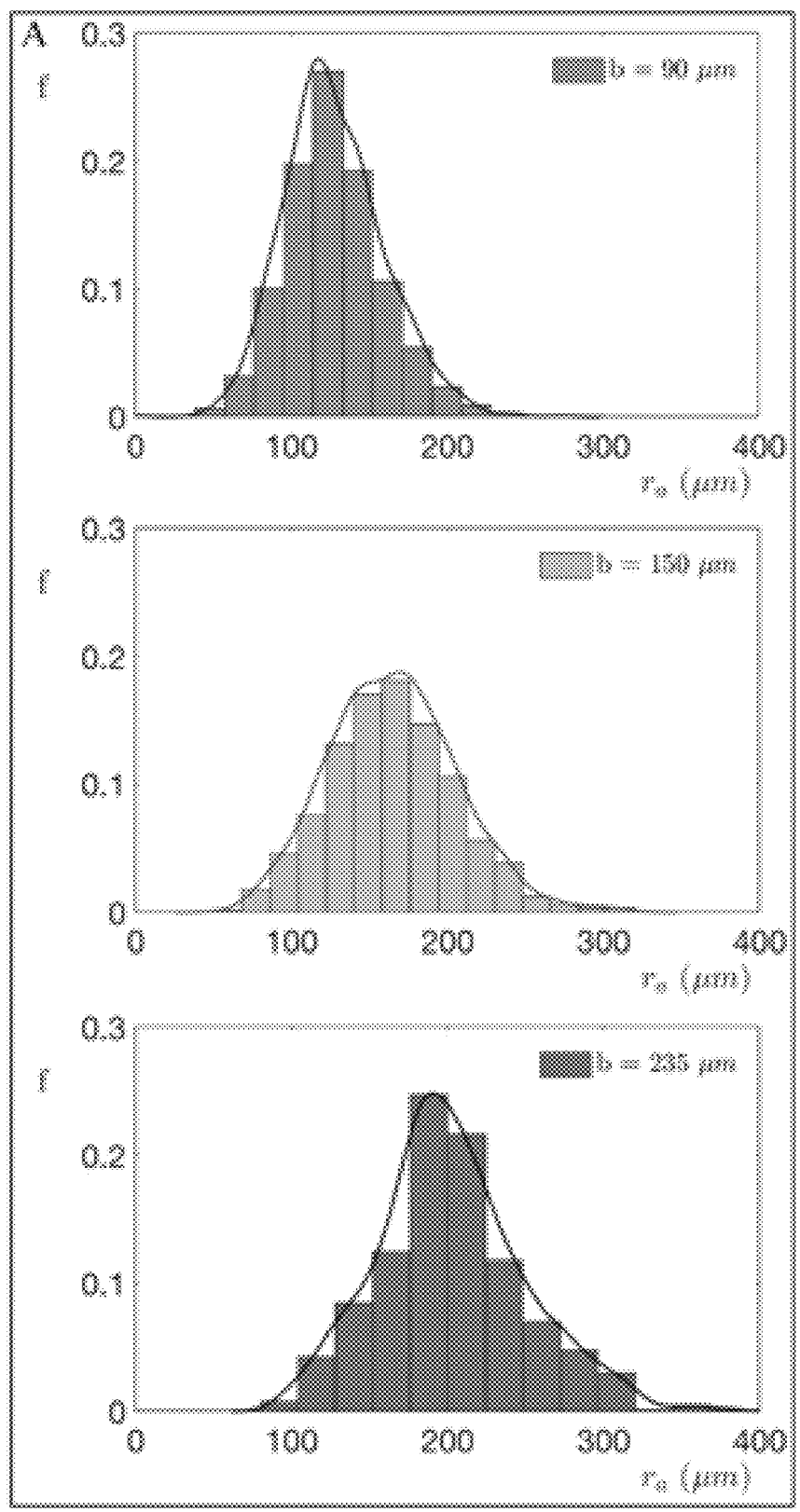
FIG. 13A is, in accordance with certain embodiments, atomized droplet radius, $r_a$, distribution for drop with velocity V/V*=3 impacting a mesh with opening size b=90 (top), 150 (middle), and 235 μm (bottom).
Figure 13B:
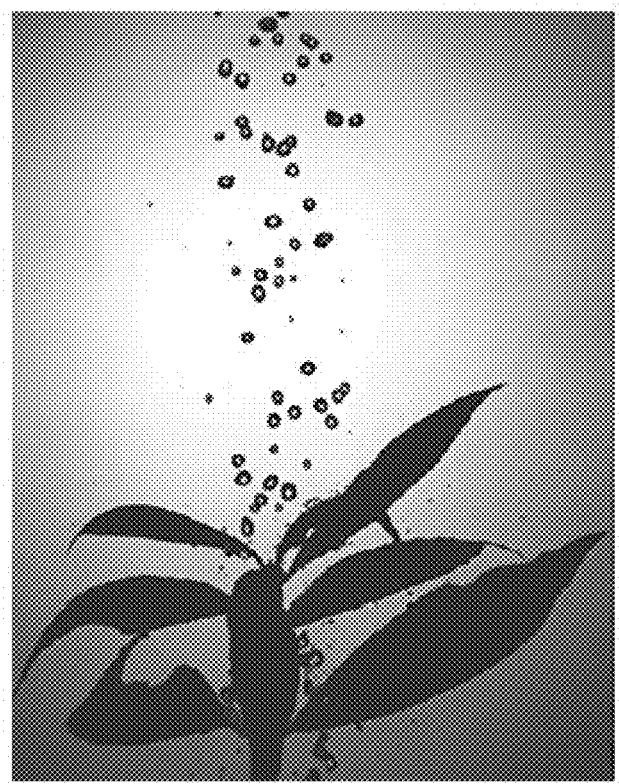
FIG. 13B is, in accordance with certain embodiments, rain of millimetric drops impacting at speed V=3 m/s directly onto the leaves of a plant (top) or through a mesh (bottom, ϕ=0.55, #=40, corresponding to ϕ=0.55 in FIG. 12D and FIG. 12F).
Figure 13B:
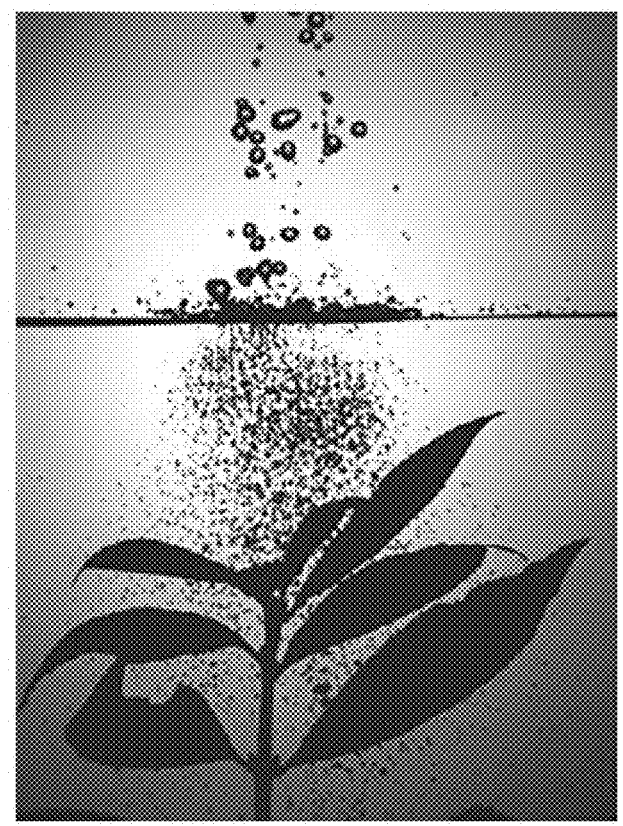

FIG. 13A is, in accordance with certain embodiments, atomized droplet radius, $r_a$, distribution for drop with velocity V/V*=3 impacting a mesh with opening size b=90 (top), 150 (middle), and 235 μm (bottom). FIG. 13B is, in accordance with certain embodiments, rain of millimetric drops impacting at speed V=3 m/s directly onto the leaves of a plant (top) or through a mesh (bottom, φ=0.55, #=40, corresponding to φ=0.55 in FIG. 12D and FIG. 12F). In the latter case (bottom of FIG. 13B), a spray of much finer droplets was generated in-situ—typically reducing the momentum of the droplets by a factor of one thousand—at the same time that the incoming rain was spread over a larger area.

To evaluate the efficiency of the atomization process, FIG. 13A shows the distribution of the atomized droplets radii, $r_a$, generated by the impact of a drop on a mesh with opening size b=90, 150, and 235 μm, respectively. To enable comparison of the results between the different meshes, the Weber number relative to the mesh holes was kept constant such that V/V*=3 in all cases. This velocity corresponded to reaching the plateau in mass transmission shown in FIGS. 12C-12F and is therefore of interest for applications. The atomized droplets size distributions exhibited a peak at 118, 165 and 190 μm, respectively, with a standard deviation of 10%. These values were close to the size of the respective opening, indicating that the droplets were generated from the Rayleigh-Plateau destabilization of the jets going through the holes. Note that the peak droplet radius was larger than the hole radius for the smaller holes while it was smaller than the hole radius for the largest opening size. This effect, while outside the scope of this example, was due to the dynamics of jet destabilization.

FIG. 13B shows raindrops falling onto the leaves of a plant with the case where a mesh atomized them in-situ. By breaking drops into thousands of smaller droplets, the momentum exerted on the target was limited by an identical factor. In particular, FIG. 13A shows that no droplets larger than 350 μm in radius were created thereby greatly reducing the deflection of the leaf, a considerable advantage for agriculture purposes where crop damage and pathogen dispersion caused by heavy rains is a major problem.

Beyond preventing disease spreading, this approach paves the way for new solutions in agricultural spraying. Indeed, in some embodiments, it allows to tackle the problem of pesticide drift by initially spraying larger drops that are atomized at a final stage, only close to the crop. In certain embodiments, the resulting spray leads to a broader coverage area due to the spreading effect of the mesh (see FIG. 13B where incoming rain laterally constrained to an initial column streak was enlarged after atomization, wetting areas that would have otherwise remained dry) and has a higher deposition efficiency because fine droplets with small velocity have a higher probability to stick to the leaves. By tuning the impact and mesh parameters, in some cases, droplet rebound on the mesh can be avoided and the transmitted mass can be maximized. In addition, drop impact on meshes can be used to increase surface-to-volume ratio without additional energy input, which leads to an enhancement of surface exchange processes such as evaporation, in certain instances. As a consequence, this work enables new approaches in evaporative processes as varied as cooling towers or multi-effect desalination. Finally, in some cases, the mesh atomization approach can be generalized to any spraying process where clogging and aging of nozzles is a problem. By considering a two-step process—generating first a spray of big drops (where clogging is less problematic) and then refining it with a mesh—maintenance and repair costs of finer nozzles can potentially be reduced and overall process efficiency can potentially be enhanced.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Some embodiments may be embodied as a method, of which various examples have been described. The acts performed as part of the methods may be ordered in any suitable way. Accordingly, embodiments may be constructed in which acts are performed in an order different than illustrated, which may include different (e.g., more or less) acts than those that are described, and/or that may involve performing some acts simultaneously, even though the acts are shown as being performed sequentially in the embodiments specifically described above.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A mesh comprising a plurality of openings, the mesh capable of inducing breakup of at least a portion of a plurality of impinging millimetric droplets into a plurality of sub-millimetric droplets when the impinging millimetric droplets are transported to the mesh solely under a gravitational force of the earth, such that an average impact area of the plurality of sub-millimetric droplets is at least 2 times larger than an average impact area of the plurality of impinging millimetric droplets without the mesh.

2. The mesh of claim 1, wherein the openings extend through the thickness of the mesh, wherein at least 10% of a facial area of the mesh is occupied by the openings, and wherein the openings have an average cross-sectional diameter of between 1 µm and 10 mm.

3. The mesh of claim 2, wherein the mesh is integrated with an agricultural system.

4. The mesh of claim 2, wherein the mesh is integrated with a cooling tower.

5. The mesh of claim 2, wherein the mesh is integrated with a humidifier.

6. The mesh of claim 2, wherein the mesh is integrated with a paint spraying system.

7. The mesh of claim 2, wherein at least 30% of a facial area of the mesh is occupied by the openings.

8. The mesh of claim 7, wherein the openings have an average cross-sectional diameter of between 50 µm and 150 µm.

9. The mesh of claim 8, wherein the mesh is integrated with an agricultural system.

10. The mesh of claim 8, wherein the mesh is integrated with a cooling tower.

11. The mesh of claim 8, wherein the mesh is integrated with a humidifier.

12. The mesh of claim 8, wherein the mesh is integrated with a paint spraying system.

13. The mesh of claim 1, wherein at least 30% of a facial area of the mesh is occupied by the openings.

14. The mesh of claim 1, wherein the openings have an average cross-sectional diameter of between 50 µm and 150 µm.

15. The mesh of claim 1, wherein the mesh is integrated with an agricultural system.

16. The mesh of claim 1, wherein the mesh is integrated with a cooling tower.

17. The mesh of claim 1, wherein the mesh is integrated with a humidifier.

18. The mesh of claim 1, wherein the mesh is integrated with a paint spraying system.

* * * * *

UNITED STATES PATENT AND TRADEMARK OFFICE
CERTIFICATE OF CORRECTION

PATENT NO. : 11,298,708 B2
APPLICATION NO. : 16/552296
DATED : April 12, 2022
INVENTOR(S) : Kripa K. Varanasi et al.

It is certified that error appears in the above-identified patent and that said Letters Patent is hereby corrected as shown below:

In the Specification

At Column 1, Line 9, "Aug. 30, 3018" should read --Aug. 30, 2018--

At Column 11, Line 40, "Aug. 30, 3018" should read --Aug. 30, 2018--

Signed and Sealed this
Seventh Day of June, 2022

Katherine Kelly Vidal
*Director of the United States Patent and Trademark Office*